US010909229B2

(12) United States Patent
Giobbi

(10) Patent No.: US 10,909,229 B2
(45) Date of Patent: *Feb. 2, 2021

(54) SECURE ELEMENT AS A DIGITAL POCKET

(71) Applicant: Proxense, LLC, Bend, OR (US)

(72) Inventor: John Joseph Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,487

(22) Filed: Jan. 3, 2018

(65) Prior Publication Data

US 2018/0129799 A1    May 10, 2018

Related U.S. Application Data

(63) Continuation of application No. 15/195,889, filed on Jun. 28, 2016, now Pat. No. 9,892,250, which is a
(Continued)

(51) Int. Cl.
*H04L 29/06* (2006.01)
*G06F 21/35* (2013.01)
(Continued)

(52) U.S. Cl.
CPC .............. *G06F 21/35* (2013.01); *G06F 21/34* (2013.01); *G06F 21/44* (2013.01);
(Continued)

(58) Field of Classification Search
CPC .. H04W 12/06; H04W 12/08; H04L 63/0853; H04L 63/0861; H04L 63/10;
(Continued)

(56) References Cited

U.S. PATENT DOCUMENTS 3,739,329 A   6/1973 Lester
3,761,883 A   9/1973 Alvarez et al.
(Continued)

FOREIGN PATENT DOCUMENTS

JP    H10-49604    2/1998
WO   00/62505     10/2000
(Continued)

OTHER PUBLICATIONS

International Search Report and Written Opinion for PCT Application No. PCT/US2014/037609, dated Dec. 9, 2014, 13 pages.
(Continued)

*Primary Examiner* — Hosuk Song
(74) *Attorney, Agent, or Firm* — Patent Law Works LLP

(57) ABSTRACT

The disclosure includes a system and method in which one or more virtual resources are presented to a secure element; and the one or more virtual resources are mapped to available resources based on a model architecture for the secure element in order to provide hardware abstraction, the available physical resources varying based on the model architecture and an associated host device, the virtual resources allowing consistent interaction with the virtual resources regardless of variation in the physical resources available and their location. The hardware abstraction increases the versatility of the secure element and may contribute to the secure element's functionality. The secure element providing functionality to replace most items carried in an individual's pockets, e.g., logical and physical keys, a thumb drive, identification, credit and debit cards, etc.

18 Claims, 16 Drawing Sheets

Related U.S. Application Data continuation of application No. 14/274,711, filed on May 10, 2014, now Pat. No. 9,405,898.

(60) Provisional application No. 61/822,057, filed on May 10, 2013, provisional application No. 61/864,237, filed on Aug. 9, 2013.

(51) Int. Cl.
    *G06F 21/44* (2013.01)
    *G06F 21/34* (2013.01)
    *H04W 12/08* (2009.01)
    *H04W 12/06* (2009.01)
    *H04W 12/00* (2009.01)

(52) U.S. Cl.
    CPC ......... *H04L 63/0861* (2013.01); *H04W 12/06* (2013.01); *H04W 12/08* (2013.01); *H04W 12/00502* (2019.01); *H04W 12/00503* (2019.01)

(58) Field of Classification Search
    CPC ... H04L 63/101; G06F 21/31; G06K 9/00275; G06K 9/00281; G06K 9/0032; G06K 9/00382
    USPC .... 713/168, 182, 185, 186, 193; 726/2–5, 9; 380/270
    See application file for complete search history.

(56) References Cited

U.S. PATENT DOCUMENTS

| | | |
|---|---|---|
| 3,906,166 A | 9/1975 | Cooper et al. |
| 4,430,705 A | 2/1984 | Cannavino et al. |
| 4,661,821 A | 4/1987 | Smith |
| 4,759,060 A | 7/1988 | Hayashi et al. |
| 4,993,068 A | 2/1991 | Piosenka et al. |
| 5,187,352 A | 2/1993 | Blair et al. |
| 5,224,164 A | 6/1993 | Elsner |
| 5,296,641 A | 3/1994 | Stelzel |
| 5,307,349 A | 4/1994 | Shloss et al. |
| 5,317,572 A | 5/1994 | Satoh |
| 5,325,285 A | 6/1994 | Araki |
| 5,392,287 A | 2/1995 | Tiedemann, Jr. et al. |
| 5,392,433 A | 2/1995 | Hammersley et al. |
| 5,410,588 A | 4/1995 | Ito |
| 5,416,780 A | 5/1995 | Patel |
| 5,422,632 A | 6/1995 | Bucholtz et al. |
| 5,428,684 A | 6/1995 | Akiyama et al. |
| 5,450,489 A | 9/1995 | Ostrover et al. |
| 5,473,690 A | 12/1995 | Grimonprez et al. |
| 5,481,265 A | 1/1996 | Russell |
| 5,506,863 A | 4/1996 | Meidan et al. |
| 5,517,502 A | 5/1996 | Bestler et al. |
| 5,541,583 A | 7/1996 | Mandelbaum |
| 5,552,776 A | 9/1996 | Wade et al. |
| 5,563,947 A | 10/1996 | Kikinis |
| 5,589,838 A | 12/1996 | McEwan |
| 5,594,227 A | 1/1997 | Deo |
| 5,598,474 A | 1/1997 | Johnson |
| 5,611,050 A | 3/1997 | Theimer et al. |
| 5,619,251 A | 4/1997 | Kuroiwa et al. |
| 5,623,552 A | 4/1997 | Lane |
| 5,629,980 A | 5/1997 | Stefik et al. |
| 5,644,354 A | 7/1997 | Thompson et al. |
| 5,666,412 A | 9/1997 | Handelman et al. |
| 5,689,529 A | 11/1997 | Johnson |
| 5,692,049 A | 11/1997 | Johnson et al. |
| 5,719,387 A | 2/1998 | Fujioka |
| 5,729,237 A | 3/1998 | Webb |
| 5,760,705 A | 6/1998 | Glessner et al. |
| 5,760,744 A | 6/1998 | Sauer |
| 5,773,954 A | 6/1998 | VanHorn |
| 5,784,464 A | 7/1998 | Akiyama et al. |
| 5,799,085 A | 8/1998 | Shona |
| 5,825,876 A | 10/1998 | Peterson, Jr. |
| 5,835,595 A | 11/1998 | Fraser et al. |
| 5,838,306 A | 11/1998 | O'Connor et al. |
| 5,854,891 A | 12/1998 | Postlewaite et al. |
| 5,857,020 A | 1/1999 | Peterson, Jr. |
| 5,886,634 A | 3/1999 | Muhme |
| 5,892,825 A | 4/1999 | Mages et al. |
| 5,892,900 A | 4/1999 | Ginter et al. |
| 5,894,551 A | 4/1999 | Huggins et al. |
| 5,898,880 A | 4/1999 | Ryu |
| 5,910,776 A | 6/1999 | Black |
| 5,917,913 A | 6/1999 | Wang |
| 5,928,327 A | 7/1999 | Wang et al. |
| 5,991,399 A | 11/1999 | Graunke et al. |
| 5,991,749 A | 11/1999 | Morrill, Jr. |
| 6,016,476 A | 1/2000 | Maes et al. |
| 6,018,739 A | 1/2000 | McCoy et al. |
| 6,025,780 A | 2/2000 | Bowers et al. |
| 6,035,038 A | 3/2000 | Campinos et al. |
| 6,035,329 A | 3/2000 | Mages et al. |
| 6,038,334 A | 3/2000 | Hamid |
| 6,040,786 A | 3/2000 | Fujioka |
| 6,041,410 A | 3/2000 | Hsu et al. |
| 6,042,006 A | 3/2000 | Van Tilburg et al. |
| 6,055,314 A | 4/2000 | Spies et al. |
| 6,070,796 A | 6/2000 | Sirbu |
| 6,088,730 A | 7/2000 | Kato et al. |
| 6,104,290 A | 8/2000 | Naguleswaran |
| 6,104,334 A | 8/2000 | Allport |
| 6,110,041 A | 8/2000 | Walker et al. |
| 6,121,544 A | 9/2000 | Petsinger |
| 6,134,283 A | 10/2000 | Sands et al. |
| 6,138,010 A | 10/2000 | Rabe et al. |
| 6,148,142 A | 11/2000 | Anderson |
| 6,148,210 A | 11/2000 | Elwin et al. |
| 6,161,179 A | 12/2000 | Seidel |
| 6,177,887 B1 | 1/2001 | Jerome |
| 6,185,316 B1 | 2/2001 | Buffam |
| 6,209,089 B1 | 3/2001 | Selitrennikoff et al. |
| 6,219,109 B1 | 4/2001 | Raynesford et al. |
| 6,219,439 B1 | 4/2001 | Burger |
| 6,219,553 B1 | 4/2001 | Panasik |
| 6,237,848 B1 | 5/2001 | Everett |
| 6,240,076 B1 | 5/2001 | Kanerva et al. |
| 6,247,130 B1 | 6/2001 | Fritsch |
| 6,249,869 B1 | 6/2001 | Drupsteen et al. |
| 6,256,737 B1 | 7/2001 | Bianco et al. |
| 6,266,415 B1 | 7/2001 | Campinos et al. |
| 6,270,011 B1 | 8/2001 | Gottfried |
| 6,279,111 B1 | 8/2001 | Jensenworth et al. |
| 6,279,146 B1 | 8/2001 | Evans et al. |
| 6,295,057 B1 | 9/2001 | Rosin et al. |
| 6,325,285 B1 | 12/2001 | Baratelli |
| 6,336,121 B1 | 1/2002 | Lyson et al. |
| 6,336,142 B1 | 1/2002 | Kato et al. |
| 6,343,280 B2 | 1/2002 | Clark |
| 6,345,347 B1 | 2/2002 | Biran |
| 6,363,485 B1 | 3/2002 | Adams et al. |
| 6,367,019 B1 | 4/2002 | Ansell et al. |
| 6,369,693 B1 | 4/2002 | Gibson |
| 6,370,376 B1 | 4/2002 | Sheath |
| 6,381,029 B1 | 4/2002 | Tipirneni |
| 6,381,747 B1 | 4/2002 | Wonfor et al. |
| 6,385,596 B1 | 5/2002 | Wiser et al. |
| 6,392,664 B1 | 5/2002 | White et al. |
| 6,397,387 B1 | 5/2002 | Rosin et al. |
| 6,401,059 B1 | 6/2002 | Shen et al. |
| 6,411,307 B1 | 6/2002 | Rosin et al. |
| 6,424,249 B1 | 7/2002 | Houvener |
| 6,424,715 B1 | 7/2002 | Saito |
| 6,425,084 B1 | 7/2002 | Rallis et al. |
| 6,434,403 B1 | 8/2002 | Ausems et al. |
| 6,434,535 B1 | 8/2002 | Kupka et al. |
| 6,446,130 B1 | 9/2002 | Grapes |
| 6,463,534 B1 | 10/2002 | Geiger et al. |
| 6,480,101 B1 | 11/2002 | Kelly et al. |
| 6,480,188 B1 | 11/2002 | Horsley |
| 6,484,260 B1 | 11/2002 | Scott et al. |

(56) References Cited

U.S. PATENT DOCUMENTS

| | | |
|---|---|---|
| 6,484,946 B2 | 11/2002 | Matsumoto et al. |
| 6,487,663 B1 | 11/2002 | Jaisimha et al. |
| 6,490,443 B1 | 12/2002 | Freeny, Jr. |
| 6,510,350 B1 | 1/2003 | Steen, III et al. |
| 6,522,253 B1 | 2/2003 | Saltus |
| 6,523,113 B1 | 2/2003 | Wehrenberg |
| 6,529,949 B1 | 3/2003 | Getsin et al. |
| 6,546,418 B2 | 4/2003 | Schena et al. |
| 6,550,011 B1 | 4/2003 | Sims, III |
| 6,563,465 B2 | 5/2003 | Frecska |
| 6,563,805 B1 | 5/2003 | Ma et al. |
| 6,564,380 B1 | 5/2003 | Murphy |
| 6,577,238 B1 | 6/2003 | Whitesmith et al. |
| 6,593,887 B2 | 7/2003 | Luk et al. |
| 6,597,680 B1 | 7/2003 | Lindskog et al. |
| 6,607,136 B1 | 8/2003 | Atsmon et al. |
| 6,628,302 B2 | 9/2003 | White et al. |
| 6,632,992 B2 | 10/2003 | Hasegawa |
| 6,633,981 B1 | 10/2003 | Davis |
| 6,645,077 B2 | 11/2003 | Rowe |
| 6,647,417 B1 | 11/2003 | Hunter et al. |
| 6,657,538 B1 | 12/2003 | Ritter |
| 6,658,566 B1 | 12/2003 | Hazard |
| 6,667,684 B1 | 12/2003 | Waggamon et al. |
| 6,669,096 B1 | 12/2003 | Saphar et al. |
| 6,671,808 B1 | 12/2003 | Abbott et al. |
| 6,683,954 B1 | 1/2004 | Searle |
| 6,697,944 B1 | 2/2004 | Jones et al. |
| 6,709,333 B1 | 3/2004 | Bradford et al. |
| 6,711,464 B1 | 3/2004 | Yap et al. |
| 6,714,168 B2 | 3/2004 | Berenbaum |
| 6,715,246 B1 | 4/2004 | Frecska et al. |
| 6,728,397 B2 | 4/2004 | McNeal |
| 6,737,955 B2 | 5/2004 | Ghabra et al. |
| 6,758,394 B2 | 7/2004 | Maskatiya et al. |
| 6,771,969 B1 | 8/2004 | Chinoy et al. |
| 6,775,655 B1 | 8/2004 | Peinado et al. |
| 6,785,474 B2 | 8/2004 | Hirt et al. |
| 6,788,640 B2 | 9/2004 | Celeste |
| 6,788,924 B1 | 9/2004 | Knutson et al. |
| 6,795,425 B1 | 9/2004 | Raith |
| 6,804,825 B1 | 10/2004 | White et al. |
| 6,806,887 B2 | 10/2004 | Chernock et al. |
| 6,839,542 B2 | 1/2005 | Sibecas et al. |
| 6,850,147 B2 | 2/2005 | Prokoski et al. |
| 6,853,988 B1 | 2/2005 | Dickinson et al. |
| 6,859,812 B1 | 2/2005 | Poynor |
| 6,861,980 B1 | 3/2005 | Rowitch et al. |
| 6,873,975 B1 | 3/2005 | Hatakeyama et al. |
| 6,879,567 B2 | 4/2005 | Callaway et al. |
| 6,879,966 B1 | 4/2005 | Lapsley et al. |
| 6,886,741 B1 | 5/2005 | Salveson |
| 6,889,067 B2 | 5/2005 | Willey |
| 6,891,822 B1 | 5/2005 | Gubbi et al. |
| 6,892,307 B1 | 5/2005 | Wood et al. |
| 6,930,643 B2 | 8/2005 | Byrne et al. |
| 6,947,003 B2 | 9/2005 | Huor |
| 6,950,941 B1 | 9/2005 | Lee et al. |
| 6,957,086 B2 | 10/2005 | Bahl et al. |
| 6,963,270 B1 | 11/2005 | Gallagher, III et al. |
| 6,963,971 B1 | 11/2005 | Bush et al. |
| 6,973,576 B2 | 12/2005 | Giobbi |
| 6,975,202 B1 | 12/2005 | Rodriguez et al. |
| 6,980,087 B2 | 12/2005 | Zukowksi |
| 6,983,882 B2 | 1/2006 | Cassone |
| 6,999,032 B2 | 2/2006 | Pakray et al. |
| 7,012,503 B2 | 3/2006 | Nielsen |
| 7,031,945 B1 | 4/2006 | Donner |
| 7,049,963 B2 | 5/2006 | Waterhouse et al. |
| 7,055,171 B1 | 5/2006 | Martin et al. |
| 7,058,806 B2 | 6/2006 | Smeets et al. |
| 7,061,380 B1 | 6/2006 | Orlando et al. |
| 7,068,623 B1 | 6/2006 | Barany et al. |
| 7,072,900 B2 | 7/2006 | Sweitzer et al. |
| 7,079,079 B2 | 7/2006 | Jo et al. |
| 7,090,126 B2 | 8/2006 | Kelly et al. |
| 7,100,053 B1 | 8/2006 | Brown et al. |
| 7,111,789 B2 | 9/2006 | Rajasekaran et al. |
| 7,112,138 B2 | 9/2006 | Hedrick et al. |
| 7,119,659 B2 | 10/2006 | Bonalle et al. |
| 7,123,149 B2 | 10/2006 | Nowak et al. |
| 7,130,668 B2 | 10/2006 | Chang et al. |
| 7,137,008 B1 | 11/2006 | Hamid et al. |
| 7,137,012 B1 | 11/2006 | Kamibayashi et al. |
| 7,139,914 B2 * | 11/2006 | Arnouse ................. G06F 21/32 713/172 |
| 7,155,416 B2 | 12/2006 | Shatford |
| 7,159,114 B1 | 1/2007 | Zajkowski et al. |
| 7,159,765 B2 | 1/2007 | Frerking |
| 7,167,987 B2 | 1/2007 | Angelo |
| 7,168,089 B2 | 1/2007 | Nguyen et al. |
| 7,176,797 B2 | 2/2007 | Zai et al. |
| 7,191,466 B1 | 3/2007 | Hamid et al. |
| 7,209,955 B1 | 4/2007 | Major et al. |
| 7,218,944 B2 | 5/2007 | Cromer et al. |
| 7,225,161 B2 | 5/2007 | Lam et al. |
| 7,230,908 B2 | 6/2007 | Vanderaar et al. |
| 7,231,068 B2 | 6/2007 | Tibor |
| 7,231,451 B2 | 6/2007 | Law et al. |
| 7,242,923 B2 | 7/2007 | Perera et al. |
| 7,249,177 B1 | 7/2007 | Miller |
| 7,272,723 B1 | 9/2007 | Abbott et al. |
| 7,277,737 B1 | 10/2007 | Vollmer et al. |
| 7,278,025 B2 | 10/2007 | Saito et al. |
| 7,295,119 B2 | 11/2007 | Rappaport et al. |
| 7,305,560 B2 | 12/2007 | Giobbi |
| 7,310,042 B2 | 12/2007 | Seifert |
| 7,314,164 B2 | 1/2008 | Bonalle et al. |
| 7,317,799 B2 | 1/2008 | Hammersmith et al. |
| 7,319,395 B2 | 1/2008 | Puzio et al. |
| 7,330,108 B2 | 2/2008 | Thomas |
| 7,333,002 B2 | 2/2008 | Bixler et al. |
| 7,333,615 B1 | 2/2008 | Jarboe et al. |
| 7,336,181 B2 | 2/2008 | Nowak et al. |
| 7,336,182 B1 | 2/2008 | Baranowski et al. |
| 7,337,326 B2 | 2/2008 | Palmer et al. |
| 7,341,181 B2 | 3/2008 | Bonalle et al. |
| 7,342,503 B1 | 3/2008 | Light et al. |
| 7,349,557 B2 | 3/2008 | Tibor |
| 7,356,393 B1 | 4/2008 | Schlatre et al. |
| 7,356,706 B2 | 4/2008 | Scheurich |
| 7,361,919 B2 | 4/2008 | Setlak |
| 7,370,366 B2 | 5/2008 | Lacan et al. |
| 7,380,202 B1 | 5/2008 | Lindhorst et al. |
| 7,382,799 B1 | 6/2008 | Young et al. |
| 7,387,235 B2 | 6/2008 | Gilbert et al. |
| 7,401,731 B1 | 7/2008 | Pletz et al. |
| 7,424,134 B2 | 9/2008 | Chou |
| 7,447,911 B2 | 11/2008 | Chou et al. |
| 7,458,510 B1 | 12/2008 | Zhou |
| 7,460,836 B2 | 12/2008 | Smith et al. |
| 7,461,444 B2 | 12/2008 | Deaett et al. |
| 7,464,053 B1 | 12/2008 | Pylant |
| 7,466,232 B2 | 12/2008 | Neuwirth |
| 7,472,280 B2 | 12/2008 | Giobbi |
| 7,512,806 B2 * | 3/2009 | Lemke ................... G06F 21/32 713/182 |
| 7,525,413 B2 | 4/2009 | Jung et al. |
| 7,529,944 B2 | 5/2009 | Hamid |
| 7,545,312 B2 | 6/2009 | Kiang et al. |
| 7,565,329 B2 | 7/2009 | Lapsley et al. |
| 7,573,382 B2 | 8/2009 | Choubey et al. |
| 7,573,841 B2 | 8/2009 | Lee et al. |
| 7,574,734 B2 | 8/2009 | Fedronic et al. |
| 7,583,238 B2 | 9/2009 | Cassen et al. |
| 7,583,643 B2 | 9/2009 | Smith et al. |
| 7,587,611 B2 | 9/2009 | Johnson et al. |
| 7,594,611 B1 | 9/2009 | Arrington, III |
| 7,595,765 B1 | 9/2009 | Hirsch et al. |
| 7,603,564 B2 | 10/2009 | Adachi |
| 7,606,733 B2 | 10/2009 | Shmueli et al. |
| 7,617,523 B2 | 11/2009 | Das et al. |
| 7,620,184 B2 | 11/2009 | Marque Pucheu |
| 7,624,417 B2 | 11/2009 | Dua |

(56) References Cited

U.S. PATENT DOCUMENTS

| | | |
|---|---|---|
| 7,640,273 B2 | 12/2009 | Wallmeier et al. |
| 7,644,443 B2 | 1/2010 | Matsuyama et al. |
| 7,646,307 B2 | 1/2010 | Plocher et al. |
| 7,652,892 B2 | 1/2010 | Shiu et al. |
| 7,676,380 B2 | 3/2010 | Graves et al. |
| 7,706,896 B2 | 4/2010 | Music et al. |
| 7,711,152 B1 | 5/2010 | Davida et al. |
| 7,715,593 B1 | 5/2010 | Adams et al. |
| 7,724,713 B2 | 5/2010 | Del Prado Pavon et al. |
| 7,724,717 B2 * | 5/2010 | Porras ............... G06K 7/0008 370/332 |
| 7,724,720 B2 | 5/2010 | Korpela et al. |
| 7,764,236 B2 | 7/2010 | Hill et al. |
| 7,765,181 B2 | 7/2010 | Thomas et al. |
| 7,773,754 B2 | 8/2010 | Buer et al. |
| 7,774,613 B2 * | 8/2010 | Lemke ............... G06F 21/32 713/182 |
| 7,780,082 B2 | 8/2010 | Handa et al. |
| 7,796,551 B1 | 9/2010 | Machiraju et al. |
| 7,813,822 B1 | 10/2010 | Hoffberg |
| 7,865,448 B2 | 1/2011 | Pizarro |
| 7,883,417 B2 | 2/2011 | Bruzzese et al. |
| 7,904,718 B2 | 3/2011 | Giobbi et al. |
| 7,943,868 B2 | 5/2011 | Anders et al. |
| 7,957,536 B2 | 6/2011 | Nolte |
| 7,961,078 B1 | 6/2011 | Reynolds et al. |
| 7,984,064 B2 | 7/2011 | Fusari |
| 7,996,514 B2 | 8/2011 | Baumert et al. |
| 8,026,821 B2 | 9/2011 | Reeder et al. |
| 8,036,152 B2 | 10/2011 | Brown et al. |
| 8,077,041 B2 | 12/2011 | Stern et al. |
| 8,081,215 B2 | 12/2011 | Kuo et al. |
| 8,082,160 B2 | 12/2011 | Collins, Jr. et al. |
| 8,089,354 B2 | 1/2012 | Perkins |
| 8,112,066 B2 | 2/2012 | Ben Ayed |
| 8,125,624 B2 | 2/2012 | Jones et al. |
| 8,135,624 B1 | 3/2012 | Ramalingam et al. |
| 8,171,528 B1 | 5/2012 | Brown |
| 8,193,923 B2 | 6/2012 | Rork et al. |
| 8,215,552 B1 | 7/2012 | Rambadt |
| 8,248,263 B2 | 8/2012 | Shervey et al. |
| 8,258,942 B1 | 9/2012 | Lanzone et al. |
| 8,294,554 B2 | 10/2012 | Shoarinejad et al. |
| 8,296,573 B2 | 10/2012 | Bolle et al. |
| 8,307,414 B2 | 11/2012 | Zerfos et al. |
| 8,325,011 B2 | 12/2012 | Butler et al. |
| 8,340,672 B2 | 12/2012 | Brown et al. |
| 8,352,730 B2 | 1/2013 | Giobbi |
| 8,373,562 B1 | 2/2013 | Heinze et al. |
| 8,387,124 B2 | 2/2013 | Smetters et al. |
| 8,390,456 B2 | 3/2013 | Puleston et al. |
| 8,395,484 B2 | 3/2013 | Fullerton |
| 8,410,906 B1 | 4/2013 | Dacus et al. |
| 8,421,606 B2 | 4/2013 | Collins, Jr. et al. |
| 8,424,079 B2 * | 4/2013 | Adams ............... G06F 21/32 713/168 |
| 8,432,262 B2 | 4/2013 | Talty et al. |
| 8,433,919 B2 | 4/2013 | Giobbi et al. |
| 8,484,696 B2 | 7/2013 | Gatto et al. |
| 8,494,576 B1 * | 7/2013 | Bye ............... G07C 9/00087 455/403 |
| 8,508,336 B2 | 8/2013 | Giobbi et al. |
| 8,511,555 B2 | 8/2013 | Babcock et al. |
| 8,519,823 B2 | 8/2013 | Rinkes |
| 8,522,019 B2 | 8/2013 | Michaelis |
| 8,558,699 B2 | 10/2013 | Butler et al. |
| 8,572,391 B2 | 10/2013 | Golan et al. |
| 8,577,091 B2 | 11/2013 | Ivanov et al. |
| 8,646,042 B1 | 2/2014 | Brown |
| 8,678,273 B2 | 3/2014 | McNeal |
| 8,717,346 B2 | 5/2014 | Claessen |
| 8,738,925 B1 | 5/2014 | Park et al. |
| 8,799,574 B2 | 8/2014 | Corda |
| 8,856,539 B2 | 10/2014 | Weiss |
| 8,914,477 B2 * | 12/2014 | Gammon ............... H04L 67/04 707/792 |
| 8,918,854 B1 | 12/2014 | Giobbi |
| 8,931,698 B2 | 1/2015 | Ishikawa et al. |
| 8,979,646 B2 | 3/2015 | Moser et al. |
| 9,037,140 B1 | 5/2015 | Brown |
| 9,049,188 B1 | 6/2015 | Brown |
| 9,165,233 B2 | 10/2015 | Testanero |
| 9,230,399 B2 | 1/2016 | Yacenda |
| 9,235,700 B1 | 1/2016 | Brown |
| 9,276,914 B2 | 3/2016 | Woodward et al. |
| 9,305,312 B2 | 4/2016 | Kountotsis et al. |
| 9,405,898 B2 * | 8/2016 | Giobbi ............... G06F 21/44 |
| 9,418,205 B2 | 8/2016 | Giobbi |
| 9,542,542 B2 | 1/2017 | Giobbi et al. |
| 9,679,289 B1 | 6/2017 | Brown |
| 9,892,250 B2 * | 2/2018 | Giobbi ............... G06F 21/44 |
| 10,073,960 B1 | 9/2018 | Brown |
| 10,110,385 B1 | 10/2018 | Rush et al. |
| 10,455,533 B2 | 10/2019 | Brown |
| 10,817,964 B2 | 10/2020 | Guillama et al. |
| 2001/0024428 A1 | 9/2001 | Onouchi |
| 2001/0026619 A1 | 10/2001 | Howard, Jr. et al. |
| 2001/0027121 A1 | 10/2001 | Boesen |
| 2001/0027439 A1 | 10/2001 | Holtzman et al. |
| 2001/0044337 A1 | 11/2001 | Rowe et al. |
| 2002/0004783 A1 | 1/2002 | Paltenghe et al. |
| 2002/0007456 A1 | 1/2002 | Peinado et al. |
| 2002/0010679 A1 | 1/2002 | Felsher |
| 2002/0013772 A1 | 1/2002 | Peinado |
| 2002/0014954 A1 | 2/2002 | Fitzgibbon et al. |
| 2002/0015494 A1 | 2/2002 | Nagai et al. |
| 2002/0019811 A1 | 2/2002 | Lapsley et al. |
| 2002/0022455 A1 | 2/2002 | Salokannel et al. |
| 2002/0023032 A1 | 2/2002 | Pearson et al. |
| 2002/0023217 A1 | 2/2002 | Wheeler et al. |
| 2002/0026424 A1 | 2/2002 | Akashi |
| 2002/0037732 A1 | 3/2002 | Gous et al. |
| 2002/0052193 A1 | 5/2002 | Chetty |
| 2002/0055908 A1 | 5/2002 | Di Giorgio et al. |
| 2002/0056043 A1 | 5/2002 | Glass |
| 2002/0059114 A1 | 5/2002 | Cockrill et al. |
| 2002/0062249 A1 | 5/2002 | Iannacci |
| 2002/0068605 A1 | 6/2002 | Stanley |
| 2002/0071559 A1 | 6/2002 | Christensen et al. |
| 2002/0073042 A1 | 6/2002 | Maritzen et al. |
| 2002/0080969 A1 | 6/2002 | Giobbi |
| 2002/0083178 A1 | 6/2002 | Brothers |
| 2002/0083318 A1 | 6/2002 | Larose |
| 2002/0086690 A1 | 7/2002 | Takahashi et al. |
| 2002/0089890 A1 | 7/2002 | Fibranz et al. |
| 2002/0091646 A1 | 7/2002 | Lake et al. |
| 2002/0095586 A1 | 7/2002 | Doyle et al. |
| 2002/0095587 A1 | 7/2002 | Doyle et al. |
| 2002/0098888 A1 | 7/2002 | Rowe et al. |
| 2002/0100798 A1 | 8/2002 | Farrugia et al. |
| 2002/0103027 A1 | 8/2002 | Rowe et al. |
| 2002/0104006 A1 | 8/2002 | Boate et al. |
| 2002/0104019 A1 | 8/2002 | Chatani et al. |
| 2002/0105918 A1 | 8/2002 | Yamada et al. |
| 2002/0108049 A1 | 8/2002 | Xu et al. |
| 2002/0109580 A1 | 8/2002 | Shreve et al. |
| 2002/0111919 A1 | 8/2002 | Weller et al. |
| 2002/0116615 A1 | 8/2002 | Nguyen et al. |
| 2002/0124251 A1 | 9/2002 | Hunter et al. |
| 2002/0128017 A1 | 9/2002 | Virtanen |
| 2002/0129262 A1 | 9/2002 | Kutaragi et al. |
| 2002/0138438 A1 | 9/2002 | Bardwell |
| 2002/0138767 A1 | 9/2002 | Hamid et al. |
| 2002/0140542 A1 | 10/2002 | Prokoski et al. |
| 2002/0141586 A1 | 10/2002 | Margalit et al. |
| 2002/0143623 A1 | 10/2002 | Dayley |
| 2002/0143655 A1 | 10/2002 | Elston et al. |
| 2002/0144117 A1 | 10/2002 | Faigle |
| 2002/0147653 A1 | 10/2002 | Shmueli et al. |
| 2002/0148892 A1 | 10/2002 | Bardwell |
| 2002/0150282 A1 | 10/2002 | Kinsella |
| 2002/0152391 A1 | 10/2002 | Willins et al. |
| 2002/0153996 A1 | 10/2002 | Chan et al. |

(56) References Cited

U.S. PATENT DOCUMENTS

| | | |
|---|---|---|
| 2002/0158121 A1 | 10/2002 | Stanford-Clark |
| 2002/0158750 A1 | 10/2002 | Almalik |
| 2002/0158765 A1 | 10/2002 | Pape et al. |
| 2002/0160820 A1 | 10/2002 | Winkler |
| 2002/0174348 A1 | 11/2002 | Ting |
| 2002/0177460 A1 | 11/2002 | Beasley et al. |
| 2002/0178063 A1 | 11/2002 | Gravelle et al. |
| 2002/0184208 A1 | 12/2002 | Kato |
| 2002/0191816 A1 | 12/2002 | Maritzen et al. |
| 2002/0196963 A1 | 12/2002 | Bardwell |
| 2002/0199120 A1 | 12/2002 | Schmidt |
| 2003/0022701 A1 | 1/2003 | Gupta |
| 2003/0034877 A1 | 2/2003 | Miller et al. |
| 2003/0036416 A1 | 2/2003 | Pattabiraman et al. |
| 2003/0036425 A1 | 2/2003 | Kaminkow et al. |
| 2003/0046228 A1 | 3/2003 | Berney |
| 2003/0046552 A1 | 3/2003 | Hamid |
| 2003/0051173 A1 | 3/2003 | Krueger |
| 2003/0054868 A1 | 3/2003 | Paulsen et al. |
| 2003/0054881 A1 | 3/2003 | Hedrick et al. |
| 2003/0055689 A1 | 3/2003 | Block et al. |
| 2003/0061172 A1 | 3/2003 | Robinson |
| 2003/0063619 A1 | 4/2003 | Montano et al. |
| 2003/0079133 A1 | 4/2003 | Breiter et al. |
| 2003/0088441 A1 | 5/2003 | McNerney |
| 2003/0105719 A1 | 6/2003 | Berger et al. |
| 2003/0109274 A1 | 6/2003 | Budka et al. |
| 2003/0115351 A1 | 6/2003 | Giobbi |
| 2003/0115474 A1 | 6/2003 | Khan et al. |
| 2003/0117969 A1 | 6/2003 | Koo et al. |
| 2003/0117980 A1 | 6/2003 | Kim et al. |
| 2003/0120934 A1 | 6/2003 | Ortiz |
| 2003/0127511 A1 | 7/2003 | Kelly et al. |
| 2003/0128866 A1 | 7/2003 | McNeal |
| 2003/0137404 A1 | 7/2003 | Bonneau, Jr. et al. |
| 2003/0139190 A1 | 7/2003 | Steelberg et al. |
| 2003/0146835 A1 | 8/2003 | Carter |
| 2003/0149744 A1 | 8/2003 | Bierre et al. |
| 2003/0163388 A1 | 8/2003 | Beane |
| 2003/0167207 A1 | 9/2003 | Berardi et al. |
| 2003/0169697 A1 | 9/2003 | Suzuki et al. |
| 2003/0172028 A1 | 9/2003 | Abell et al. |
| 2003/0172037 A1 | 9/2003 | Jung et al. |
| 2003/0174839 A1 | 9/2003 | Yamagata et al. |
| 2003/0176218 A1 | 9/2003 | LeMay et al. |
| 2003/0186739 A1 | 10/2003 | Paulsen et al. |
| 2003/0195842 A1 | 10/2003 | Reece |
| 2003/0213840 A1 | 11/2003 | Livingston et al. |
| 2003/0223394 A1 | 12/2003 | Parantainen et al. |
| 2003/0225703 A1 | 12/2003 | Angel |
| 2003/0226031 A1 | 12/2003 | Proudler et al. |
| 2003/0233458 A1 | 12/2003 | Kwon et al. |
| 2004/0002347 A1 | 1/2004 | Hoctor et al. |
| 2004/0015403 A1 | 1/2004 | Moskowitz et al. |
| 2004/0022384 A1 | 2/2004 | Flores et al. |
| 2004/0029620 A1 | 2/2004 | Karaoguz |
| 2004/0029635 A1 | 2/2004 | Giobbi |
| 2004/0030764 A1 | 2/2004 | Birk et al. |
| 2004/0030894 A1 | 2/2004 | Labrou et al. |
| 2004/0035644 A1 | 2/2004 | Ford et al. |
| 2004/0039909 A1 | 2/2004 | Cheng |
| 2004/0048570 A1 | 3/2004 | Oba et al. |
| 2004/0048609 A1 | 3/2004 | Kosaka |
| 2004/0059682 A1 | 3/2004 | Hasumi et al. |
| 2004/0059912 A1 | 3/2004 | Zizzi |
| 2004/0064728 A1 | 4/2004 | Scheurich |
| 2004/0068656 A1 | 4/2004 | Lu |
| 2004/0073792 A1 | 4/2004 | Noble et al. |
| 2004/0081127 A1 | 4/2004 | Gardner et al. |
| 2004/0082385 A1 | 4/2004 | Silva et al. |
| 2004/0098597 A1 | 5/2004 | Giobbi |
| 2004/0114563 A1 | 6/2004 | Shvodian |
| 2004/0117644 A1 | 6/2004 | Colvin |
| 2004/0123106 A1 | 6/2004 | D'Angelo et al. |
| 2004/0123127 A1 | 6/2004 | Teicher et al. |
| 2004/0127277 A1 | 7/2004 | Walker et al. |
| 2004/0128162 A1 | 7/2004 | Schlotterbeck et al. |
| 2004/0128389 A1 | 7/2004 | Kopchik |
| 2004/0128500 A1 | 7/2004 | Cihula et al. |
| 2004/0128508 A1 | 7/2004 | Wheeler et al. |
| 2004/0128519 A1 | 7/2004 | Klinger et al. |
| 2004/0129787 A1 | 7/2004 | Saito et al. |
| 2004/0137912 A1 | 7/2004 | Lin |
| 2004/0158746 A1 | 8/2004 | Hu et al. |
| 2004/0166875 A1 | 8/2004 | Jenkins et al. |
| 2004/0167465 A1 | 8/2004 | Mihai et al. |
| 2004/0193925 A1 | 9/2004 | Safriel |
| 2004/0194133 A1 | 9/2004 | Ikeda et al. |
| 2004/0203566 A1 | 10/2004 | Leung |
| 2004/0203923 A1 | 10/2004 | Mullen |
| 2004/0208139 A1 | 10/2004 | Iwamura |
| 2004/0209690 A1 | 10/2004 | Bruzzese et al. |
| 2004/0209692 A1 | 10/2004 | Schober et al. |
| 2004/0214582 A1 | 10/2004 | Lan et al. |
| 2004/0215615 A1 | 10/2004 | Larsson et al. |
| 2004/0217859 A1 | 11/2004 | Pucci et al. |
| 2004/0218581 A1 | 11/2004 | Cattaneo |
| 2004/0222877 A1 | 11/2004 | Teramura et al. |
| 2004/0230488 A1 | 11/2004 | Beenau et al. |
| 2004/0234117 A1 | 11/2004 | Tibor |
| 2004/0243519 A1 | 12/2004 | Perttila et al. |
| 2004/0246103 A1 | 12/2004 | Zukowski |
| 2004/0246950 A1 | 12/2004 | Parker et al. |
| 2004/0252012 A1 | 12/2004 | Beenau et al. |
| 2004/0252659 A1 | 12/2004 | Yun et al. |
| 2004/0253996 A1 | 12/2004 | Chen et al. |
| 2004/0254837 A1 | 12/2004 | Roshkoff |
| 2004/0255139 A1 | 12/2004 | Giobbi |
| 2004/0255145 A1 | 12/2004 | Chow |
| 2005/0001028 A1 | 1/2005 | Zuili |
| 2005/0002028 A1 | 1/2005 | Kasapi et al. |
| 2005/0005136 A1 | 1/2005 | Chen et al. |
| 2005/0006452 A1 | 1/2005 | Aupperle et al. |
| 2005/0021561 A1 | 1/2005 | Noonan |
| 2005/0025093 A1 | 2/2005 | Yun et al. |
| 2005/0028168 A1 | 2/2005 | Marcjan |
| 2005/0035897 A1 | 2/2005 | Perl et al. |
| 2005/0039027 A1 | 2/2005 | Shapiro |
| 2005/0040961 A1 | 2/2005 | Tuttle |
| 2005/0047386 A1 | 3/2005 | Yi |
| 2005/0049013 A1 | 3/2005 | Chang et al. |
| 2005/0050208 A1 | 3/2005 | Chatani |
| 2005/0050324 A1 | 3/2005 | Corbett et al. |
| 2005/0054431 A1 | 3/2005 | Walker et al. |
| 2005/0055242 A1 | 3/2005 | Bello et al. |
| 2005/0055244 A1 | 3/2005 | Mullan et al. |
| 2005/0058292 A1 | 3/2005 | Diorio et al. |
| 2005/0074126 A1 | 4/2005 | Stanko |
| 2005/0076242 A1 | 4/2005 | Breuer |
| 2005/0081040 A1 | 4/2005 | Johnson et al. |
| 2005/0086115 A1 | 4/2005 | Pearson |
| 2005/0089000 A1 | 4/2005 | Bae et al. |
| 2005/0090200 A1 | 4/2005 | Karaoguz et al. |
| 2005/0091338 A1 | 4/2005 | de la Huerga |
| 2005/0094657 A1 | 5/2005 | Sung et al. |
| 2005/0097037 A1 | 5/2005 | Tibor |
| 2005/0105600 A1 | 5/2005 | Culum et al. |
| 2005/0105734 A1 | 5/2005 | Buer et al. |
| 2005/0108164 A1 | 5/2005 | Salafia, III et al. |
| 2005/0109836 A1 | 5/2005 | Ben-Aissa |
| 2005/0109841 A1 | 5/2005 | Ryan et al. |
| 2005/0113070 A1 | 5/2005 | Okabe |
| 2005/0114149 A1 | 5/2005 | Rodriguez et al. |
| 2005/0114150 A1 | 5/2005 | Franklin |
| 2005/0116020 A1 | 6/2005 | Smolucha et al. |
| 2005/0117530 A1 | 6/2005 | Abraham et al. |
| 2005/0119979 A1 | 6/2005 | Murashita et al. |
| 2005/0124294 A1 | 6/2005 | Wentink |
| 2005/0125258 A1 | 6/2005 | Yellin et al. |
| 2005/0138390 A1 | 6/2005 | Adams et al. |
| 2005/0138576 A1 | 6/2005 | Baumert et al. |
| 2005/0139656 A1 | 6/2005 | Arnouse |
| 2005/0141451 A1 | 6/2005 | Yoon et al. |
| 2005/0152394 A1 | 7/2005 | Cho |

(56) References Cited

U.S. PATENT DOCUMENTS

| | | |
|---|---|---|
| 2005/0154897 A1 | 7/2005 | Holloway et al. |
| 2005/0161503 A1 | 7/2005 | Remery et al. |
| 2005/0167482 A1 | 8/2005 | Ramachandran et al. |
| 2005/0169292 A1 | 8/2005 | Young |
| 2005/0180385 A1 | 8/2005 | Jeong et al. |
| 2005/0182661 A1 | 8/2005 | Allard et al. |
| 2005/0182975 A1 | 8/2005 | Guo et al. |
| 2005/0187792 A1 | 8/2005 | Harper |
| 2005/0192748 A1 | 9/2005 | Andric et al. |
| 2005/0195975 A1 | 9/2005 | Kawakita |
| 2005/0200453 A1 | 9/2005 | Turner et al. |
| 2005/0201389 A1 | 9/2005 | Shimanuki et al. |
| 2005/0203682 A1 | 9/2005 | Omino et al. |
| 2005/0203844 A1 | 9/2005 | Ferguson et al. |
| 2005/0210270 A1 | 9/2005 | Rohatgi et al. |
| 2005/0212657 A1 | 9/2005 | Simon |
| 2005/0215233 A1 | 9/2005 | Perera et al. |
| 2005/0216313 A1 | 9/2005 | Claud et al. |
| 2005/0216639 A1 | 9/2005 | Sparer et al. |
| 2005/0220046 A1 | 10/2005 | Falck et al. |
| 2005/0221869 A1 | 10/2005 | Liu et al. |
| 2005/0229007 A1 | 10/2005 | Bolle et al. |
| 2005/0229240 A1 | 10/2005 | Nanba |
| 2005/0242921 A1 | 11/2005 | Zimmerman et al. |
| 2005/0243787 A1 | 11/2005 | Hong et al. |
| 2005/0251688 A1 | 11/2005 | Nanavati et al. |
| 2005/0253683 A1 | 11/2005 | Lowe |
| 2005/0257102 A1 | 11/2005 | Moyer et al. |
| 2005/0264416 A1 | 12/2005 | Maurer |
| 2005/0269401 A1 | 12/2005 | Spitzer et al. |
| 2005/0272403 A1 | 12/2005 | Ryu et al. |
| 2005/0281320 A1 | 12/2005 | Neugebauer |
| 2005/0282558 A1 | 12/2005 | Choi et al. |
| 2005/0284932 A1 | 12/2005 | Sukeda et al. |
| 2005/0288069 A1 | 12/2005 | Arunan et al. |
| 2006/0001525 A1 | 1/2006 | Nitzan et al. |
| 2006/0014430 A1 | 1/2006 | Liang et al. |
| 2006/0022042 A1 | 2/2006 | Smets et al. |
| 2006/0022046 A1 | 2/2006 | Iwamura |
| 2006/0022800 A1 | 2/2006 | Krishna et al. |
| 2006/0025180 A1 | 2/2006 | Rajkotia et al. |
| 2006/0026673 A1 | 2/2006 | Tsuchida |
| 2006/0030353 A1 | 2/2006 | Jun |
| 2006/0034250 A1 | 2/2006 | Kim et al. |
| 2006/0041746 A1 | 2/2006 | Kirkup et al. |
| 2006/0046664 A1 | 3/2006 | Paradiso et al. |
| 2006/0058102 A1 | 3/2006 | Nguyen et al. |
| 2006/0063575 A1 | 3/2006 | Gatto et al. |
| 2006/0069814 A1 | 3/2006 | Abraham et al. |
| 2006/0072586 A1 | 4/2006 | Callaway, Jr. et al. |
| 2006/0074713 A1 | 4/2006 | Conry et al. |
| 2006/0076401 A1 | 4/2006 | Frerking |
| 2006/0078176 A1 | 4/2006 | Abiko et al. |
| 2006/0087407 A1 | 4/2006 | Stewart et al. |
| 2006/0089138 A1 | 4/2006 | Smith et al. |
| 2006/0097949 A1 | 5/2006 | Luebke et al. |
| 2006/0110012 A1 | 5/2006 | Ritter |
| 2006/0111955 A1 | 5/2006 | Winter et al. |
| 2006/0113381 A1 | 6/2006 | Hochstein et al. |
| 2006/0117013 A1 | 6/2006 | Wada |
| 2006/0136728 A1 | 6/2006 | Gentry et al. |
| 2006/0136742 A1 | 6/2006 | Giobbi |
| 2006/0143441 A1 | 6/2006 | Giobbi |
| 2006/0144943 A1 | 7/2006 | Kim |
| 2006/0156027 A1 | 7/2006 | Blake |
| 2006/0158308 A1 | 7/2006 | McMullen et al. |
| 2006/0163349 A1 | 7/2006 | Neugebauer |
| 2006/0165060 A1 | 7/2006 | Dua |
| 2006/0170565 A1 | 8/2006 | Husak et al. |
| 2006/0173991 A1 | 8/2006 | Piikivi |
| 2006/0183426 A1 | 8/2006 | Graves et al. |
| 2006/0184795 A1 | 8/2006 | Doradla et al. |
| 2006/0185005 A1 | 8/2006 | Graves et al. |
| 2006/0187029 A1 | 8/2006 | Thomas |
| 2006/0190348 A1 | 8/2006 | Ofer et al. |
| 2006/0190413 A1 | 8/2006 | Harper |
| 2006/0194598 A1 | 8/2006 | Kim et al. |
| 2006/0195576 A1 | 8/2006 | Rinne et al. |
| 2006/0198337 A1 | 9/2006 | Hoang et al. |
| 2006/0205408 A1 | 9/2006 | Nakagawa et al. |
| 2006/0208066 A1 | 9/2006 | Finn et al. |
| 2006/0208853 A1 | 9/2006 | Kung et al. |
| 2006/0222042 A1 | 10/2006 | Teramura et al. |
| 2006/0229909 A1 | 10/2006 | Kaila et al. |
| 2006/0236373 A1 | 10/2006 | Graves et al. |
| 2006/0237528 A1 | 10/2006 | Bishop et al. |
| 2006/0238305 A1 | 10/2006 | Loving et al. |
| 2006/0268891 A1 | 11/2006 | Heidari-Bateni et al. |
| 2006/0273176 A1 | 12/2006 | Audebert et al. |
| 2006/0274711 A1 | 12/2006 | Nelson, Jr. et al. |
| 2006/0279412 A1 | 12/2006 | Holland et al. |
| 2006/0286969 A1 | 12/2006 | Talmor et al. |
| 2006/0288095 A1 | 12/2006 | Torok et al. |
| 2006/0290580 A1 | 12/2006 | Noro et al. |
| 2006/0293925 A1 | 12/2006 | Flom |
| 2006/0294388 A1 | 12/2006 | Abraham et al. |
| 2007/0001783 A1 | 1/2007 | Lutz et al. |
| 2007/0005403 A1 | 1/2007 | Kennedy et al. |
| 2007/0007331 A1 | 1/2007 | Jasper et al. |
| 2007/0008070 A1 | 1/2007 | Friedrich |
| 2007/0008916 A1 | 1/2007 | Haugli et al. |
| 2007/0011724 A1 | 1/2007 | Gonzalez et al. |
| 2007/0016800 A1 | 1/2007 | Spottswood et al. |
| 2007/0019845 A1 | 1/2007 | Kato |
| 2007/0029381 A1 | 2/2007 | Braiman |
| 2007/0032288 A1 | 2/2007 | Nelson et al. |
| 2007/0033072 A1 | 2/2007 | Bildirici |
| 2007/0033150 A1 | 2/2007 | Nwosu |
| 2007/0038751 A1 | 2/2007 | Jorgensen |
| 2007/0043594 A1 | 2/2007 | Lavergne |
| 2007/0050259 A1 | 3/2007 | Wesley |
| 2007/0050398 A1 | 3/2007 | Mochizuki |
| 2007/0051798 A1 | 3/2007 | Kawai et al. |
| 2007/0055630 A1 | 3/2007 | Gauthier et al. |
| 2007/0060095 A1 | 3/2007 | Subrahmanya et al. |
| 2007/0060319 A1 | 3/2007 | Block et al. |
| 2007/0064742 A1 | 3/2007 | Shvodian |
| 2007/0069852 A1 | 3/2007 | Mo et al. |
| 2007/0072636 A1 | 3/2007 | Worfolk et al. |
| 2007/0073553 A1 | 3/2007 | Flinn et al. |
| 2007/0084523 A1 | 4/2007 | McLean et al. |
| 2007/0084913 A1 | 4/2007 | Weston |
| 2007/0087682 A1 | 4/2007 | DaCosta |
| 2007/0087834 A1 | 4/2007 | Moser et al. |
| 2007/0100939 A1 | 5/2007 | Bagley et al. |
| 2007/0109117 A1 | 5/2007 | Heitzmann et al. |
| 2007/0112676 A1 | 5/2007 | Kontio et al. |
| 2007/0118891 A1 | 5/2007 | Buer |
| 2007/0132586 A1 | 6/2007 | Plocher et al. |
| 2007/0133478 A1 | 6/2007 | Armbruster et al. |
| 2007/0136407 A1 | 6/2007 | Rudelic |
| 2007/0152826 A1 | 7/2007 | August et al. |
| 2007/0156850 A1 | 7/2007 | Corrion |
| 2007/0158411 A1 | 7/2007 | Krieg, Jr. |
| 2007/0159301 A1 | 7/2007 | Hirt et al. |
| 2007/0159994 A1 | 7/2007 | Brown et al. |
| 2007/0169121 A1 | 7/2007 | Hunt et al. |
| 2007/0174809 A1 | 7/2007 | Brown et al. |
| 2007/0176756 A1 | 8/2007 | Friedrich |
| 2007/0180047 A1 | 8/2007 | Dong et al. |
| 2007/0187266 A1 | 8/2007 | Porter et al. |
| 2007/0192601 A1 | 8/2007 | Spain et al. |
| 2007/0194882 A1 | 8/2007 | Yokota et al. |
| 2007/0204078 A1 | 8/2007 | Boccon-Gibod et al. |
| 2007/0205860 A1 | 9/2007 | Jones et al. |
| 2007/0205861 A1 | 9/2007 | Nair et al. |
| 2007/0213048 A1 | 9/2007 | Trauberg |
| 2007/0214492 A1 | 9/2007 | Gopi et al. |
| 2007/0218921 A1 | 9/2007 | Lee et al. |
| 2007/0219926 A1 | 9/2007 | Korn |
| 2007/0220272 A1 | 9/2007 | Campisi et al. |
| 2007/0229268 A1 | 10/2007 | Swan et al. |
| 2007/0245157 A1 | 10/2007 | Giobbi et al. |
| 2007/0245158 A1 | 10/2007 | Giobbi et al. |

(56) References Cited

U.S. PATENT DOCUMENTS

| | | |
|---|---|---|
| 2007/0247366 A1 | 10/2007 | Smith et al. |
| 2007/0258626 A1 | 11/2007 | Reiner |
| 2007/0260883 A1 | 11/2007 | Giobbi et al. |
| 2007/0260888 A1 | 11/2007 | Giobbi et al. |
| 2007/0266257 A1 | 11/2007 | Camaisa et al. |
| 2007/0268862 A1 | 11/2007 | Singh et al. |
| 2007/0271194 A1 | 11/2007 | Walker et al. |
| 2007/0271433 A1 | 11/2007 | Takemura |
| 2007/0277044 A1 | 11/2007 | Graf et al. |
| 2007/0280509 A1 | 12/2007 | Owen et al. |
| 2007/0285212 A1 | 12/2007 | Rotzoll |
| 2007/0285238 A1 | 12/2007 | Batra |
| 2007/0288263 A1 | 12/2007 | Rodgers |
| 2007/0288752 A1 | 12/2007 | Chan |
| 2007/0293155 A1 | 12/2007 | Liao et al. |
| 2007/0294755 A1 | 12/2007 | Dadhia et al. |
| 2007/0296544 A1 | 12/2007 | Beenau et al. |
| 2008/0001783 A1 | 1/2008 | Cargonja et al. |
| 2008/0005432 A1 | 1/2008 | Kagawa |
| 2008/0008359 A1 | 1/2008 | Beenau et al. |
| 2008/0011842 A1 | 1/2008 | Curry et al. |
| 2008/0012685 A1 | 1/2008 | Friedrich et al. |
| 2008/0012767 A1 | 1/2008 | Caliri et al. |
| 2008/0016004 A1 | 1/2008 | Kurasaki et al. |
| 2008/0019578 A1 | 1/2008 | Saito et al. |
| 2008/0028453 A1 | 1/2008 | Nguyen et al. |
| 2008/0046715 A1 | 2/2008 | Balazs et al. |
| 2008/0049700 A1 | 2/2008 | Shah et al. |
| 2008/0061941 A1 | 3/2008 | Fischer et al. |
| 2008/0071577 A1 | 3/2008 | Highley |
| 2008/0072063 A1 | 3/2008 | Takahashi et al. |
| 2008/0088475 A1 | 4/2008 | Martin |
| 2008/0090548 A1 | 4/2008 | Ramalingam |
| 2008/0095359 A1 | 4/2008 | Schreyer et al. |
| 2008/0107089 A1 | 5/2008 | Larsson et al. |
| 2008/0109895 A1 | 5/2008 | Janevski |
| 2008/0111752 A1 | 5/2008 | Lindackers et al. |
| 2008/0129450 A1 | 6/2008 | Riegebauer |
| 2008/0148351 A1 | 6/2008 | Bhatia et al. |
| 2008/0149705 A1 | 6/2008 | Giobbi et al. |
| 2008/0150678 A1 | 6/2008 | Giobbi et al. |
| 2008/0156866 A1 | 7/2008 | McNeal |
| 2008/0164997 A1 | 7/2008 | Aritsuka et al. |
| 2008/0169909 A1 | 7/2008 | Park et al. |
| 2008/0186166 A1 | 8/2008 | Zhou et al. |
| 2008/0188308 A1 | 8/2008 | Shepherd et al. |
| 2008/0201768 A1 | 8/2008 | Koo et al. |
| 2008/0209571 A1 | 8/2008 | Bhaskar et al. |
| 2008/0218416 A1 | 9/2008 | Handy et al. |
| 2008/0222701 A1 | 9/2008 | Saaranen et al. |
| 2008/0228524 A1 | 9/2008 | Brown |
| 2008/0235144 A1 | 9/2008 | Phillips |
| 2008/0238625 A1 | 10/2008 | Rofougaran et al. |
| 2008/0250388 A1 | 10/2008 | Meyer et al. |
| 2008/0251579 A1 | 10/2008 | Larsen |
| 2008/0278325 A1 | 11/2008 | Zimman et al. |
| 2008/0289030 A1 | 11/2008 | Poplett |
| 2008/0289032 A1 | 11/2008 | Aoki et al. |
| 2008/0303637 A1 | 12/2008 | Gelbman et al. |
| 2008/0313728 A1 | 12/2008 | Pandrangi et al. |
| 2008/0314971 A1 | 12/2008 | Faith et al. |
| 2008/0316045 A1 | 12/2008 | Sriharto et al. |
| 2009/0002134 A1 | 1/2009 | McAllister |
| 2009/0013191 A1 | 1/2009 | Popowski |
| 2009/0016573 A1 | 1/2009 | McAfee, II et al. |
| 2009/0024584 A1 | 1/2009 | Dharap et al. |
| 2009/0033464 A1 | 2/2009 | Friedrich |
| 2009/0033485 A1 | 2/2009 | Naeve et al. |
| 2009/0036164 A1 | 2/2009 | Rowley |
| 2009/0045916 A1 | 2/2009 | Nitzan et al. |
| 2009/0052389 A1 | 2/2009 | Qin et al. |
| 2009/0070146 A1 | 3/2009 | Haider et al. |
| 2009/0076849 A1 | 3/2009 | Diller |
| 2009/0081996 A1 | 3/2009 | Duggal et al. |
| 2009/0096580 A1 | 4/2009 | Paananen |
| 2009/0125401 A1 | 5/2009 | Beenau et al. |
| 2009/0140045 A1 | 6/2009 | Evans |
| 2009/0157512 A1 | 6/2009 | King |
| 2009/0176566 A1 | 7/2009 | Kelly |
| 2009/0177495 A1 | 7/2009 | Abousy et al. |
| 2009/0199206 A1 | 8/2009 | Finkenzeller et al. |
| 2009/0237245 A1 | 9/2009 | Brinton et al. |
| 2009/0237253 A1 | 9/2009 | Neuwirth |
| 2009/0239667 A1 | 9/2009 | Rowe et al. |
| 2009/0264712 A1 | 10/2009 | Baldus et al. |
| 2009/0310514 A1 | 12/2009 | Jeon et al. |
| 2009/0313689 A1 | 12/2009 | Nystrom et al. |
| 2009/0319788 A1 | 12/2009 | Zick et al. |
| 2009/0320118 A1 | 12/2009 | Muller et al. |
| 2009/0322510 A1 | 12/2009 | Berger et al. |
| 2009/0328182 A1 | 12/2009 | Malakapalli et al. |
| 2010/0007498 A1 | 1/2010 | Jackson |
| 2010/0023074 A1 | 1/2010 | Powers et al. |
| 2010/0037255 A1 | 2/2010 | Sheehan et al. |
| 2010/0077214 A1 | 3/2010 | Jogand-Coulomb et al. |
| 2010/0117794 A1 | 5/2010 | Adams et al. |
| 2010/0134257 A1 | 6/2010 | Puleston et al. |
| 2010/0169442 A1 | 7/2010 | Liu et al. |
| 2010/0169964 A1 | 7/2010 | Liu et al. |
| 2010/0174911 A1 | 7/2010 | Isshiki |
| 2010/0188226 A1 | 7/2010 | Seder et al. |
| 2010/0214100 A1 | 8/2010 | Page |
| 2010/0277283 A1 | 11/2010 | Burkart et al. |
| 2010/0277286 A1 | 11/2010 | Burkart et al. |
| 2010/0291896 A1 | 11/2010 | Corda |
| 2010/0305843 A1 | 12/2010 | Yan et al. |
| 2010/0328033 A1 | 12/2010 | Kamei |
| 2011/0072034 A1 | 3/2011 | Sly et al. |
| 2011/0072132 A1 | 3/2011 | Shafer et al. |
| 2011/0082735 A1 | 4/2011 | Kannan et al. |
| 2011/0085287 A1 | 4/2011 | Ebrom et al. |
| 2011/0091136 A1 | 4/2011 | Danch et al. |
| 2011/0116358 A9 | 5/2011 | Li et al. |
| 2011/0126188 A1 | 5/2011 | Bernstein et al. |
| 2011/0227740 A1 | 9/2011 | Wohltjen |
| 2011/0238517 A1 | 9/2011 | Ramalingam et al. |
| 2011/0246790 A1 | 10/2011 | Koh et al. |
| 2011/0266348 A1 | 11/2011 | Denniston, Jr. |
| 2011/0307599 A1 | 12/2011 | Saretto et al. |
| 2012/0086571 A1 | 4/2012 | Scalisi et al. |
| 2012/0182123 A1 | 7/2012 | Butler et al. |
| 2012/0212322 A1 | 8/2012 | Idsoe |
| 2012/0226451 A1 | 9/2012 | Bacot et al. |
| 2012/0226907 A1 | 9/2012 | Hohberger et al. |
| 2013/0019295 A1 | 1/2013 | Park et al. |
| 2013/0019323 A1 | 1/2013 | Arvidsson et al. |
| 2013/0044111 A1 | 2/2013 | VanGilder et al. |
| 2013/0111543 A1 | 5/2013 | Brown et al. |
| 2013/0276140 A1 | 10/2013 | Coffing et al. |
| 2013/0331063 A1 | 12/2013 | Cormier et al. |
| 2014/0074696 A1 | 3/2014 | Glaser |
| 2014/0266713 A1 | 9/2014 | Sehgal et al. |
| 2015/0310385 A1 | 10/2015 | King et al. |
| 2016/0210614 A1 | 7/2016 | Hall |
| 2017/0085564 A1 | 3/2017 | Giobbi et al. |

FOREIGN PATENT DOCUMENTS

| | | |
|---|---|---|
| WO | 01/22724 | 3/2001 |
| WO | 01/35334 | 5/2001 |
| WO | 01/75876 | 10/2001 |
| WO | 01/77790 | 10/2001 |
| WO | 2004/038563 | 5/2004 |
| WO | 2005/050450 | 6/2005 |
| WO | 2005/086802 | 9/2005 |
| WO | 2007/087558 | 8/2007 |

OTHER PUBLICATIONS

Smart Card Alliance, "Smart Cards and Biometrics White Paper: Smart Card Alliance," May 2002, retrieved from http://www.securitymanagement.com/library/smartcard_faqtech0802.pdf on Jan. 7, 2007, 7 pgs.

(56) References Cited

OTHER PUBLICATIONS

Micronas, "Micronas and Thomson Multimedia Showcase a New Copy Protection System that Will Drive the Future of Digital Television," Jan. 8, 2002, retrieved from www.micronas.com/press/pressreleases/printer.php?ID=192 on Mar. 4, 2002, 3 pgs.

Muller, "Desktop Encyclopedia of the Internet," 1999, Artech House Inc., Norwood, MA, all pages.

National Criminal Justice Reference Service, "Antenna Types," Dec. 11, 2006, online at http://ncjrs.gov/pdfffiles1/nij/185030b.pdf, retrieved from http://web.archive.org/web/*/http://www.ncjrs.gov/pdffiles1/nij/185030b.pdf on Jan. 12, 2011, 1 pg.

Nel et al., "Generation of Keys for use with the Digital Signature Standard (DSS)," Communications and Signal Processing, Proceedings of the 1993 IEEE South African Symposium, Aug. 6, 1993, pp. 6-11.

Nerd Vittles, "magicJack: Could It Be the Asterisk Killer?" Aug. 1, 2007, retrieved from http://nerdvittles.com/index.php?p=187 on or before Oct. 11, 2011, 2 pgs.

Nilsson et al., "Match-on-Card for Java Cards," Precise Biometrics, white paper, Apr. 2004, retrieved from www.ibia.org/membersadmin/whitepapers/pdf/17/Precise%20Match-on-Card%20for%20Java%20Cards.pdf on Jan. 7, 2007, 5 pgs.

Noore, "Highly Robust Biometric Smart Card Design." IEEE Transactions on Consumer Electronics, vol. 46, No. 4, Nov. 2000, pp. 1059-1063.

Nordin, "Match-on-Card Technology," Precise Biometrics, white paper, Apr. 2004, retrieved from www.ibia.org/membersadmin/whitepapers/pdf/17/Precise%20Match-on-Card%20technology.pdf on Jan. 7, 2007, 7 pgs.

Paget, "The Security Behind Secure Extranets," Enterprise Systems Journal, vol. 14, No. 12, Dec. 1999, 4 pgs.

Pash, "Automate proximity and location-based computer actions," Jun. 5, 2007, retrieved from http://lifehacker.com/265822/automate-proximity-and-location+based-computer-actions on or before Oct. 11, 2011, 3 pgs.

Pope et al., "Oasis Digital Signature Services: Digital Signing without the Headaches," IEEE Internet Computing, vol. 10, Sep./Oct. 2006, pp. 81-84.

SAFlink Corporation, "SAFModule™: A Look Into Strong Authentication," white paper, retrieved from www.ibia.org/membersadmin/whitepapers/pdf/6/SAFmod_WP.pdf on Jan. 7, 2007, 8 pgs.

Sapsford, "E-Business: Sound Waves Could Help Ease Web-Fraud Woes," Wall Street Journal, Aug. 14, 2000, p. 81.

Singh et al. "A Constraint-Based Biometric Scheme on ATM and Swiping Machine." 2016 International Conference on Computational Techniques in Information and Communication Technologies (ICCTICT), Mar. 11, 2016, pp. 74-79.

Smart Card Alliance, "Contactless Technology for Secure Physical Access: Technology and Standards Choices," Smart Card Alliance, Oct. 2002, pp. 1-48.

Smart Card Alliance, "Alliance Activities: Publications: Identity: Identity Management Systems, Smart Cards and Privacy," 1997-2007, retrieved from www.smartcardalliance.org/pages/publications-identity on Jan. 7, 2007, 3 pgs.

SplashID, "SplashID—Secure Password Manager for PDAs and Smartphones," Mar. 8, 2007, retrieved from http://www.splashdata.com/splashid/ via http://www.archive.org/ on or before Oct. 11, 2011, 2 pgs.

Srivastava, "Is internet security a major issue with respect to the slow acceptance rate of digital signatures," Jan. 2, 2005, Computer Law & Security Report, pp. 392-404.

Thomson Multimedia, "Thomson multimedia unveils copy protection proposal designed to provide additional layer of digital content security," retrieved from www.thompson-multimedia.com/gb/06/c01/010530.htm on Mar. 4, 2002, May 30, 2001, 2 pgs.

Unixhelp, "What is a file?" Apr. 30, 1998, retrieved from unixhelp.ed.ac.uk/editors/whatisafile.html.accessed Mar. 11, 2010 via http://waybackmachine.org/19980615000000*/http://unixhelp.ed.ac.uk/editors/whatisafile.html on Mar. 11, 2011, 1 pg.

Vainio, "Bluetooth Security," Helsinki University of Technology, May 25, 2000, 17 pgs.

Van Winkle, "Bluetooth: The King of Connectivity," Laptop Buyer's Guide and Handbook, Jan. 2000, pp. 148-153.

Wade, "Using Fingerprints to Make Payments at POS Slowly Gaining Popularity," Credit Union Journal, International Biometric Group, Apr. 21, 2003, retrieved from http://www.biometricgroup.com/in_the_news/04.21.03.html on Jan. 7, 2007, 3 pgs.

Wallace, "The Internet Unplugged," InformationWeek, vol. 765, No. 22, Dec. 13, 1999, pp. 22-24.

Weber, "In the Age of Napster, Protecting Copyright is a Digital Arms Race," Wall Street Journal, Eastern ed., Jul. 24, 2000, p. B1.

White, "How computers Work," Millennium Edition, 1999, Que Corporation, Indianapolis, IN, all pages.

Yoshida, "Content protection plan targets wireless home networks," EE Times, Jan. 11, 2002, retrieved from www.eetimes.com/story/OEG20020111S0060 on Mar. 4, 2002, 2 pgs.

Anonymous, "Applying Biometrics to Door Access," Security Magazine, Sep. 26, 2002, retrieved from http://www.securitymagazine.com/CDA/Articles/Technologies/3ae610eaa34d8010VgnVCM100000f932a8c0 on Jan. 7, 2007.

Anonymous, "Firecrest Shows How Truly Commercially-Minded Companies Will Exploit the Internet," Computergram International, Jan. 18, 1996, 2 pgs.

Anonymous, "IEEE 802.15.4-2006—Wikipedia, the free encyclopedia," Wikipedia, last modified Mar. 21, 2009, retrieved from http://en.wikipedia.org/wiki/IEEE_802.15.4-2006 on Apr. 30, 2009, 5 pgs.

Antonoff, "Visiting Video Valley," Sound & Vision, Nov. 2001, pp. 116, 118-119.

Apple et al., "Smart Card Setup Guide," 2006, downloaded from http://manuals.info.apple.com/en_US/Smart_Card_Setup_Guide.pdf on or before May 3, 2012, 16 pgs.

Balanis, "Antenna Theory: A Review," Jan. 1992, Proceedings of the IEEE, vol. 80, No. 1, p. 13.

Beaufour, "Personal Servers as Digital Keys," Proceedings of the Second IEEE Annual Conference on Pervasive Computing and Communications (PERCOM'04), Mar. 14-17, 2004, pp. 319-328.

BioPay, LLC, "Frequently Asked Questions (FAQs) About BioPay," retrieved from http://www.biopay.com/faqs-lowes.asp on Jan. 7, 2007, 5 pgs.

BlueProximity, "BlueProximity—Leave it—it's locked, come back, it's back too . . . " Aug. 26, 2007, retrieved from http://blueproximity.sourceforge.net/ via http://www.archive.org/ on or before Oct. 11, 2011, 1 pg.

Bluetooth Sig, Inc. "Bluetooth," www.bluetoothcom, Jun. 1, 2000, 8 pgs.

Bluetooth Sig, Inc., "Say Hello to Bluetooth," retrieved from www.bluetooth.com, at least as early as Jan. 14, 2005, 4 pgs.

Blum, "Digital Rights Management May Solve the Napster 'Problem,'" Technology Investor, Oct. 2000, pp. 24-27.

Bohrsatom et al., "Automatically unlock PC when entering proximity," Dec. 7, 2005, retrieved from http://salling.com/forums/viewtopic.php?t=3190 on or before Oct. 11, 2011, 3 pgs.

Brown, "Techniques for Privacy and Authentication in Personal Communication Systems," Personal Communications, IEEE, Aug. 1995, vol. 2, No. 4, pp. 6-10.

Chen et al. "On Enhancing Biometric Authentication with Data Protection." KES2000. Fourth International Conference on Knowledge-Based Intelligent Engineering Systems and Allied Technologies. Proceedings (Cat. No. 00TH8516), vol. 1, Aug. 1, 2000, pp. 249-252.

Cisco Systems, Inc., "Antenna Patterns and Their Meaning," 1992-2007, p. 10.

Costa, "Imation USB 2.0 Micro Hard Drive," Nov. 22, 2005, retrieved from http://www.pcmag.com/article2/0,2817,1892209,00.asp on or before Oct. 11, 2011, 2 pgs.

Dagan, "Power over Ethernet (PoE) Midspan—The Smart Path to Providign Power for IP Telephony," Product Manager, Systems, Aug. 2005, Power Dsine Inc., 28 pgs.

Dai et al., "Toward Blockchain-Based Accounting and Assurance," 2017, Journal of Information Systems, pp. 5-21.

(56) References Cited

OTHER PUBLICATIONS

Debow, "Credit/Debit Debuts in Midwest Smart Card Test," Computers in Banking, vol. 6, No. 11, Nov. 1989, pp. 10-13.
Dennis, "Digital Passports Need Not Infringe Civil Liberties," Newsbytes, NA, Dec. 2, 1999, 2 pgs.
Derfler, "How Networks Work," Bestseller Edition, 1996, Ziff-Davis Press, Emeryville, CA, all pages.
Farouk et al., "Authentication Mechanisms in Grid Computing Environment: Comparative Study," IEEE, Oct. 2012, p. 1-6.
Fasca, "S3, Via Formalize Agreement," Electronic News, The Circuit, 45(45, Nov. 8, 1999), p. 20.
Giobbi, Specification of U.S. Appl. No. 60/824,758, filed Sep. 6, 2006, all pages.
Govindan et al. "Real Time Security Management Using RFID, Biometric and Smart Messages." 2009 3rd International Conference on Anti-Counterfeiting, Security, and Identification in Communication, Aug. 20, 2009, pp. 282-285.
Gralla, "How the Internet Works," Millennium Edition, 1999, Que Corporation, Indianapolis, IN, all pages.
Hendron, "File Security, Keychains, Encryptioin, and More with Mac OS X (10.3+)" Apr. 4, 2005, downloaded from http://www.johnhendron.net/documents/OSX_Security.pdf on or before May 3, 2012, 30 pgs.
IEEE Computer Society, "IEEE Std 802.15.4™—Part 15.4: Wireless Medium Access Control (MAC) and Physical Layer (PHY) Specifications for Low-Rate Wireless Personal Area Networks (LR-WPANs)," The Institute of Electrical and Electronics Engineers, Inc., New York, NY, Oct. 1, 2003, 679 pgs.
International Search Report and Written Opinion for International Application No. PCT/US04/38124, dated Apr. 7, 2005, 10 pgs.
International Search Report and Written Opinion for International Application No. PCT/US05/07535, dated Dec. 6, 2005, 6 pgs.
International Search Report and Written Opinion for International Application No. PCT/US05/43447, dated Feb. 22, 2007, 7 pgs.
International Search Report and Written Opinion for International Application No. PCT/US05/46843, dated Mar. 1, 2007, 10 pgs.
International Search Report and Written Opinion for International Application No. PCT/US07/00349, dated Mar. 19, 2008, 10 pgs.
International Search Report and Written Opinion for International Application No. PCT/US07/11102, dated Oct. 3, 2008, 11 pgs.
International Search Report and Written Opinion for International Application No. PCT/US07/11103, dated Apr. 23, 2008, 9 pgs.
International Search Report and Written Opinion for International Application No. PCT/US07/11104, dated Jun. 26, 2008, 9 pgs.
International Search Report and Written Opinion for International Application No. PCT/US07/11105, dated Oct. 20, 2008, 10 pgs.
International Search Report and Written Opinion for International Application No. PCT/US08/83060, dated Dec. 29, 2008, 9 pgs.
International Search Report and Written Opinion for International Application No. PCT/US08/87835, dated Feb. 11, 2009, 8 pgs.
International Search Report and Written Opinion for International Application No. PCT/US09/34095, dated Mar. 25, 2009, 11 pgs.
International Search Report and Written Opinion for International Application No. PCT/US2009/039943, dated Jun. 1, 2009, 9 pgs.
Jeyaprakash et al. "Secured Smart Card Using Palm Vein Biometric On-Card-Process." 2008 International Conference on Convergence and Hybrid Information Technology, 2008, pp. 548-551.
Katz et al., "Smart Cards and Biometrics in Privacy-Sensitive Secure Personal Identification System," May 2002, Smart Card Alliance, p. 1-29.
Kontzer, "Thomson Bets on Smart Cards for Video Encryption," InformationWeek, Jun. 7, 2001, retrieved from www.informationweek.com/story/IWK20010607S0013 on Mar. 4, 2002, 1 pg.
Lake, "Downloading for Dollars: Who said buying music off the Net would be easy?," Sound & Vision, Nov. 2000, pp. 137-138.
Lee et al., "Effects of dielectric superstrates on a two-layer electromagnetically coupled patch antenna," Antennas and Propagation Society International Symposium, Jun. 1989, AP-S. Digest, vol. 2, pp. 26-30, found at http://ieeexplore.ieee.org/stamp/stamp.jsp?tp=&arnumber=1347.
Lewis, "Sony and Visa in On-Line Entertainment Venture," New York Times, vol. 145, Thurs. Ed., Nov. 16, 1995, 1 pg.
Liu et al., "A Practical Guide to Biometric Security Technology, " IT Pro, vol. 3, No. 1, Jan./Feb. 2001, pp. 27-32.
McIver et al., "Identification and Verification Working Together," Bioscrypt, White Paper: Identification and Verification Working Together, Aug. 27, 2004, retrieved from www.ibia.org/membersadmin/whitepapers/pdf/15/Identification%20and%20Verification%20Working%20Together.pdf on Jan. 7, 2007, 5 pgs.

* cited by examiner

SECURE ELEMENT AS A DIGITAL POCKET

CROSS REFERENCE TO RELATED APPLICATIONS

This application is a continuation of and claims the priority to U.S. application Ser. No. 15/195,889, filed Jun. 28, 2016, titled "Secure Element as a Digital Pocket" which is a continuation of and claims the priority to U.S. application Ser. No. 14/274,711, filed May 10, 2014, titled "Secure Element as a Digital Pocket" which claims the benefit of U.S. Provisional Patent Application No. 61/822,057, filed May 10, 2013, and of U.S. Provisional Patent Application No. 61/864,237, filed Aug. 9, 2013, the entireties of which are hereby incorporated by reference.

Applicants hereby notify the USPTO that the claims of the present application are different from those of the aforementioned related applications. Therefore, Applicant rescinds any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application, the grandparent application or any other related application.

BACKGROUND

A typical individual will frequently participate in activities such as accessing a physical or digital object, securing a physical or digital object, conducting a transaction and storing/retrieving data. Such activities may be facilitated and secured using one or more items carried, for example, in a pocket, by the user. For example, an individual may carry a RFID or Bluetooth key to access and secure his/her home or office and a wireless key fob to access and operate his/her vehicle. The individual may also carry a physical wallet with a government issued identification, cards issued by financial institutions for accessing associated funds or completing transactions, and other cards issued by other entities (e.g. insurance cards, membership cards, rewards cards, etc.). The individual may also carry a storage device, for example, a USB thumb-drive for storing data. The individual may also carry and use a password manager for maintaining passwords for various objects (e.g. user accounts).

What is needed is a single device that consolidates the functionality and replaces the multiple, potentially bulky, items carried by an individual. What is further needed is for the device to be compatible with existing devices and systems in order to provide features and functionality such as authentication and proximity based access thereto.

SUMMARY

According to one innovative aspect of the subject matter described in this disclosure, a system comprises a secure element configured to wirelessly communicate directly with an associated host device, the secure element including a memory storing data and a wireless storage module executable by a processor of the secure element; and the associated host device including a link module executable by a processor, the link module of the associated host device cooperating with the wireless storage module of the secure element to wirelessly mount at least a portion of the memory as a storage drive of the associated storage drive.

Other aspects include corresponding methods, apparatus, systems and computer program products. These and other implementations may each optionally include one or more of the following features. For instance, a biometric sensor configured to obtain physical or behavioral characteristics from a user; and an identification module executable by the processor of the secure element to authenticate the user as an owner of the secure element based on the obtained physical or behavioral characteristic. For instance, one or more of the mounting of the portion of the memory and a user accessing the mounted portion of the memory is responsive successful authentication of the user as the owner of the secure element based on the obtained physical or behavioral characteristic. For instance, the biometric sensor is included in the secure element. For instance, the biometric sensor is included in the associated host device, but available to the secure element as a virtual biometric sensor via an abstraction layer. For instance, the wirelessly mounted portion of the memory appears to the host device as a storage drive physically connected to the host device. For instance, the mounting of the portion of the memory is based on one or more of a user configurable proximity and a user configurable duration of time for the secure element to be in proximity to the associated host device.

In general, another innovative aspect of the subject matter described in this disclosure may be embodied in methods that include presenting, to a secure element, one or more virtual resources; and mapping the one or more virtual resources to one or more available physical resources based on a model architecture for the secure element and to provide hardware abstraction, the available physical resources varying based on the model architecture and an associated host device, the virtual resources allowing consistent interaction with the virtual resources regardless of variation in the physical resources available and their location.

Other aspects include corresponding methods, apparatus, systems and computer program products. These and other implementations may each optionally include one or more of the following features. For instance, the model architecture is a proxy model architecture, the operations further including: mapping a first virtual resource to a first resource on the associated host device, and wherein the mapping allows the secure element to interact with the first virtual resource as if the first virtual resource is a local resource of the secure element, wherein the secure element and the associated computing device are physically separate devices. For instance, the model architecture is a proxy model architecture, the operations further including: performing, at the secure element, a functionality of the secure element, the associated host device wirelessly controlling the performance of the functionality, the secure element performing the functionality on behalf of the associated host device, wherein the associated host device is physically separate from the secure element. For instance, wherein the functionality of the secure element performed is one or more of an authentication and the execution of a financial transaction. For instance, the operations further including determining whether the security element is in proximity to the associated host device; and responsive to determining the secure element is in proximity to the associated host device, permitting access to the associated host device. For instance, the secure element may be associated with one or more additional host devices and permit access to the one or more additional host devices when in proximity to the one or more additional host devices. For instance, the operations further including: determining whether the security element is in proximity to the associated host device; and responsive to determining the secure element is in proximity to the associated host device, wirelessly mounting at least a portion of a memory of the secure element on the associated host device, the mounted portion of the memory appearing as a physically connected storage device at the associated host device. For instance, the secure element may be associated with one or more additional host devices and mounts the portion of the memory to the one or more additional host devices when in proximity to the one or more additional host devices. For instance, the model architecture is a stand-alone model architecture, and the one or more virtual resources are mapped to physical resources available on the secure element. For instance, the model architecture is a stand-alone model architecture, and the one or more virtual resources are mapped to physical resources available on the secure element. For instance, the model architecture is a virtual model architecture, and the one or more virtual resources are mapped to physical resources available on the host device, wherein the secure element is a virtual secure element operating on the associated host device, but appearing to other devices as a separate device. For instance the secure element is platform agnostic and operates the same regardless of a platform the associated host device is operating. For instance, the secure element is a single device that performs functionality of a thumb drive, a physical key, a logical key, a proximity based lock and performs user authentication.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The specification is illustrated by way of example and not by way of limitation in the figures of the accompanying drawings in which like reference numerals are used to refer to similar elements.

The figures depict various embodiments for purposes of illustration only. It should be recognized from the following discussion that alternative embodiments of the structures and methods illustrated herein may be employed without departing from the principles described herein.

DETAILED DESCRIPTION

Figure 1:
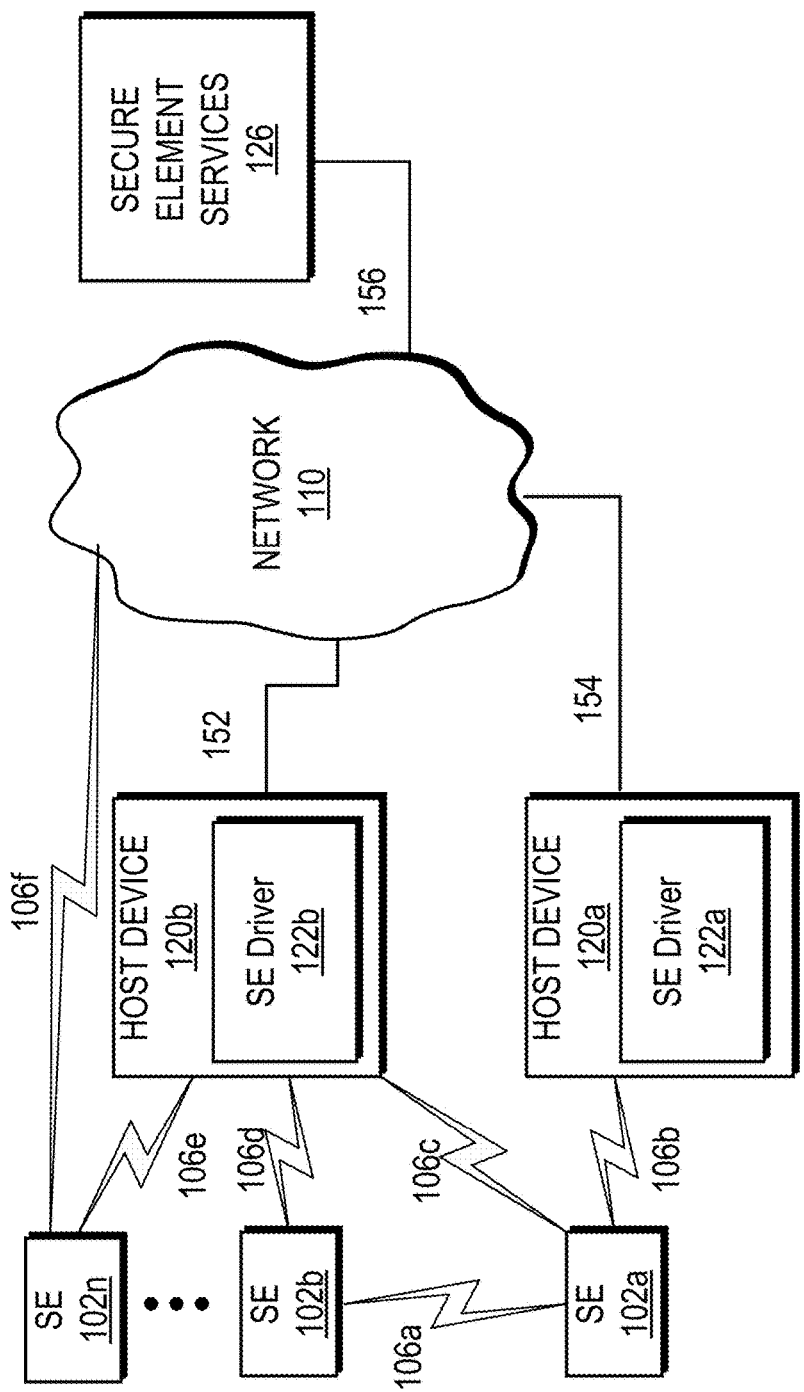
FIG. 1 is a block diagram illustrating an example system with secure elements according to one embodiment.

FIG. 1 is a block diagram illustrating an example system with secure elements according to one embodiment. The illustrated system 100 includes secure elements (SE) 102a, 102b and 102n, host devices 120a and 120b, a network 110, and secure element services 126. In FIG. 1 and the remaining figures, a letter after a specific number, for example "102a" may be a reference to the element having that particular reference number. A reference number without a following letter, for example "102," may be a general reference to the embodiments bearing that reference number.

In the illustrated embodiment, secure element 102a may wirelessly couple for bi-directional, secure communication with SE 102b by signal line 106a, with host device 120a by signal line 106b and with host device 120b by signal line 106c. Secure element 102b may also wirelessly couple for bi-directional, secure communication with host device 120b by signal line 106d. SE 102n may wirelessly couple for bi-directional, secure communication with host device 120b by signal line 106e and with network 110 by signal line 106g. Host device 102a may wirelessly couple for bi-directional, secure communication with SE 102b by signal line 106a, with host device 120b by signal line 106f (e.g. when a host device 120 includes a virtual SE as discussed below) and may couple for communication to network 110 by signal line 154. Host device 102b may couple for communication to network 110 by signal line 152. Secure element services 126 may couple to the network 110 by signal line 156 and provide various services to a host device 120, a SE 102 or both via the network 110.

It should be noted that the signal lines 106 for secure, wireless, bi-directional communication are not necessarily simultaneous. For example, signal line 106a may be established when SE 102a and host device 120a are within detection range and SE 102a may act as a proximity based key to allow access to the host device 120a (e.g. a work computer). Signal line 106a may be subsequently severed and when SE 102a is within detection range of host device 120b (e.g. a personal computer at home) the signal line 106c is established.

The SE 102 is a compact, portable, single point solution for authentication and enabling access. In one embodiment, the SE 102 provides a wireless thumb drive, authentication (including multi-factor and biometric), physical/logical access control and an e-wallet for use in financial transactions in a single device that is capable of replacing many of the items carried by a typical individual including, for example, keys, a wallet (e.g. ID, credit cards, insurance cards, membership cards, loyalty cards, etc.) and a thumb drive. Additionally, the SE 102 combines authentication, proximity sensing and biometrically-triggered interactions to conveniently reduce direct handling of and interaction with the SE 102 while maintaining security. While the illustrated embodiment includes three secure elements 102, the disclosure herein applies to systems including at least one secure element (SE) 102.

The network 110 may provide communication between one or more of an SE 102, a host device 120, secure element services module 126. For example, an SE 102 may communicate location and tracking data to the secure elements services 126 using the network 110 and communication channel 156 via a secure, wireless communication channel 106 to the network 110 or a host device 102.

In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), 3G, 4G, Wi-Fi, etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above. In some embodiments, the network 110 may include the Internet and/or the cellular data network.

A host device 120 is a computing device. Examples of host devices 120 include, but are not limited to desktop computers, laptops, tablets, cellular or smart phones, point of sale devices, etc. While the illustrated embodiment 100 includes two host devices 120, some embodiments of a system with secure elements 102 may have a different number of host devices 120 or may lack a host device 120. Additionally, it should be noted that the host devices 120*a* and 120*b* may be a mixture of different types of host devices 120. For example, host device 120*a* may be a smartphone and host device 120*b* may be a desktop computer. Furthermore, the host devices 120*a* and 120*b* may run the same or different platforms, or operating systems. Examples of platforms may include, but are not limited to, Windows, Mac OS, Linux, iOS, Android, Blackberry, Fire OS, etc.

In one embodiment, the host device 120 includes at least one processor (not shown). Depending on the embodiment, the host device 120 may also include other elements including one or more of a memory (not shown), a storage device (not shown), a keyboard (not shown), a graphics adapter (not shown), a pointing device (not shown), a display device (not shown), one or more ports (e.g. serial, USB, Ethernet, etc.), one or more radio transceivers (e.g. Wi-Fi, Bluetooth, 3G/4G, etc.) and one or more sensors (e.g. a biometric sensor).

In the illustrated embodiment, host device 120*a* includes SE driver 122*a* and host device 120*b* includes SE driver 122*b*. In one embodiment, a SE driver is stored in the host device's memory (not shown) and executed by the host device's processor (not shown). The SE driver 122 may facilitate setup of the SE 102, communication with a SE 102 and enable an SE 102 to be associated with the host device 120 and cooperate with the SE 102 to provide the functionality described herein. For example, the SE driver 122 enables the SE 102 to act as a proximity based lock for the host device or a physical or logical asset accessible thereby and to act as a secure, wireless storage device. The SE driver 122 is discussed further with reference to FIG. 10 below.

The host device 120 may also include one or more applications (not shown), which may be stored in the host device's memory (not shown) and executed by the host device's processor (not shown). The one or more applications may use an API and the SE driver 122 to request, control and facilitate some of the functionality provided by the SE 102 as described herein. For example, in one embodiment, a smartphone application for a retailer may use an API and the SE driver 122 to have the SE 102 authenticate the user and complete a financial transaction on behalf of the application.

As is known in the art, a host device 120 can have different and/or other components than those mentioned herein. In addition, the host device 120 can lack certain listed components. As is known in the art, the host device 120 and SE 102 are adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device loaded into the memory, and executed by the processor.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 2:
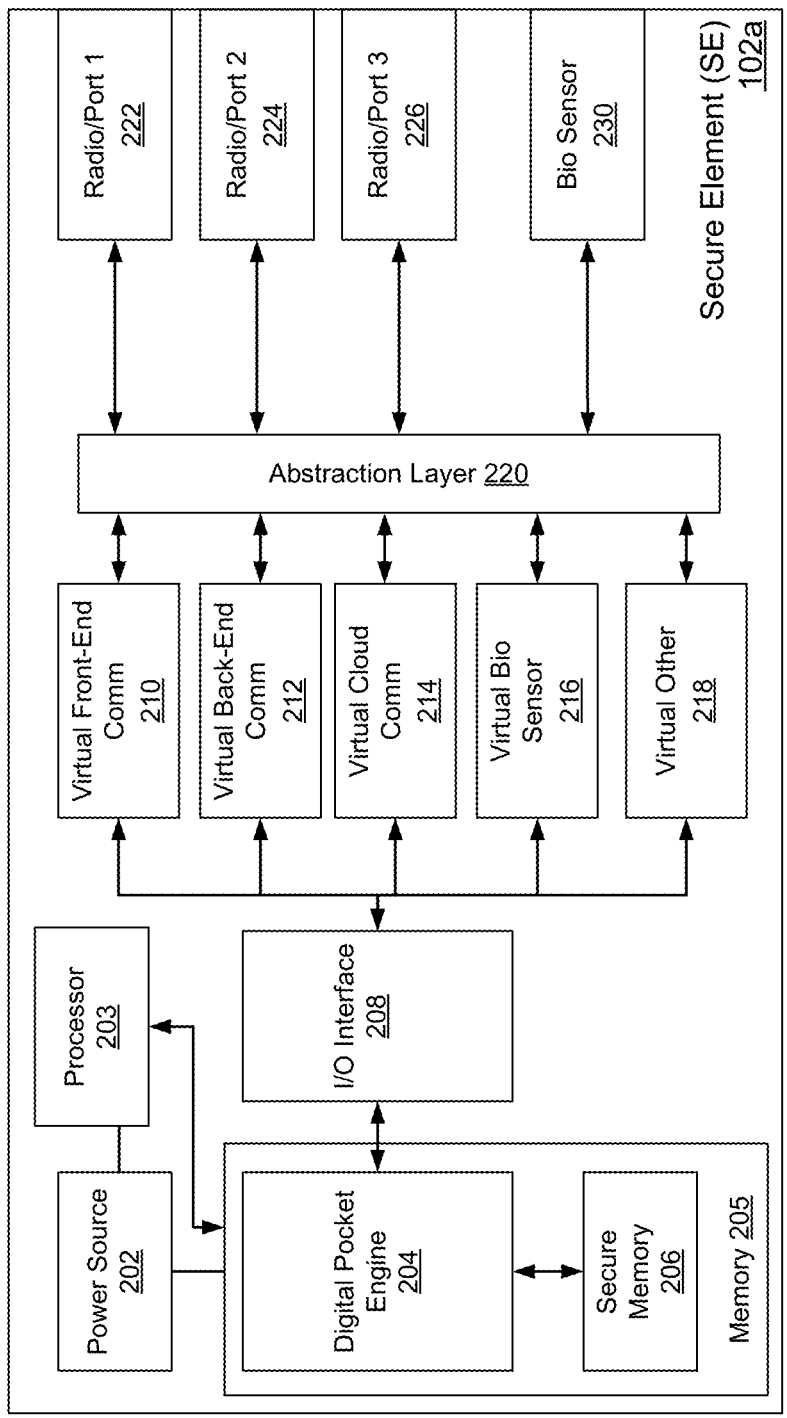
FIG. 2 is a block diagram illustrating an example of a secure element according to one embodiment.

FIG. 2 is a block diagram illustrating an example of a secure element (SE) 102 according to one embodiment. The SE 102 includes a processor 203 and a memory 205. In some embodiments, the SE 102 may include additional elements including a power source 202, an input/output ("I/O") interface 208, radio/port 222/224/226 and a bio sensor 230.

The memory 205 is any device capable of holding data and may include one or more of a hard drive, compact disk read-only memory (CD-ROM), DVD, RAM or a solid-state memory device. The memory 205 may include a read-only memory, a once-programmable memory, a read/write memory or any combination of memory types including physical access secured and tamperproof memories. For example, in one embodiment, the It should be recognized that the preceding are merely examples and other memories may be present and that the memory may be physically or logically partitioned. For example, in one embodiment, the memory 205 is physically partitioned and comprised of multiple memories, e.g., a built-in, solid state memory storing an operating system, unique ID associated with the SE 102 and the digital pocket engine 204, and a removable memory such as a SIM card. In one embodiment, the SIM card is logically partitioned into portions that are controlled by the digital pocket engine 204 and portions that are protected by the digital pocket engine 204. The memory 205 or portions thereof may be secured (i.e. secure memory 206) for example using encryption and other methods.

In one embodiment, there are multiple types of SEs 102. See Appendix A. For example, in one embodiment, an SE 102 may be of a personal security element ("PSE") type or of a general security element ("GSE") type. In one embodiment, an SE's 102 type is determined based on the intended use and the user data stored. For example, a PSE may be intended for personal use and persistently stores user data and biometrics of the owner and a GSE may be intended for general (or non-personal) use and stores no user data and biometrics persistently. In one embodiment, a PSE is carried by a user and associated with the user and a GSE is associated with a device such as check-out station in a business. In one embodiment, both a PSE and a GSE may store in memory 205/206 one or more of a unique ID, public name, available service, Stationary/Mobile, location data and application specific service blocks; however, a PSE may also store biometric data or other personal data of the owner.

The processor 203 executes instructions and routines to perform the functionality of the SE 102 described herein. In one embodiment, the processor 203 is a central processing unit (CPU). The power source 202 may include a battery, such as a rechargeable lithium ("Li") ion battery. In one embodiment, the battery is rechargeable via one of the radio/ports 222/224/226 (e.g. a USB port).

A radio/port 222/224/226 may be a radio transceiver or a port. Examples of radio transceivers may be transceivers for Bluetooth, Wi-Fi, near-field communication (NFC), 3G/4G, DNLA, etc. Examples of ports include USB, mini-USB, micro-USB, serial, Firewire, HDMI, etc. In the illustrated embodiment, three radio/ports 222/224/226 are shown; however, the SE 102 may include one or more radio/ports. Additionally, the radio/ports 222/224/226 may be a mixture of different radio transceivers, ports or both. In one embodiment, at a minimum, a SE 102 includes at least one radio transceiver capable of communicating with other SEs 102.

The bio sensor 230 is a sensor for receiving biometric information describing a physical or behavioral characteristic from a user. For clarity and convenience, the result of fingerprint scan and a fingerprint reader/scanner are occasionally used throughout the description as an example of biometric information and a biosensor 230, respectively. However, the biometrics and bios sensors 230 are not merely limited to fingerprints. Other examples of biometrics include a retinal scan, an iris scan, a facial scan, a voice sample, a signature, DNA, RNA or any other suitable biometric, and the biometric sensor 230 may be a sensor(s) suitable for capturing the biometric (e.g. camera for face, microphone for voice, touch pad for signature, etc.).

The I/O interface 208 is an interface between the digital pocket engine 204 and the radio/ports 222, 224, 226 and bio sensor 230. In one embodiment, the SE 102 includes an abstraction layer 220 that enables the I/O interface 208 to utilize resources without regard to those resources' physical attributes, settings or locations.

In one embodiment, the abstraction layer 220 does this by presenting virtual, consistent resources 210, 212, 214, 216, 218 to the I/O interface 208, announces the secure element architecture (discussed below with reference to FIGS. 3-8), announces the onboard resources and requested resources to another device (e.g. another SE 102 or a host device 120), and maps the virtual resources 210, 212, 214, 216, 218 to available, on-board resources and, when requested and permitted by the secure element architecture, to resources of another device.

For example, certain actions in the system 100 may require that the user provide biometric information for authentication. In some embodiments, depending on the action being taken or the SE(s) 102 and host device(s) 120 involved in the action, a user may be required to provide the biometric information locally (e.g. using the bio sensor 230 on his/her SE 102), or remotely (e.g. using the bio sensor on another user's SE 102 or on a host device 120 and received at the SE 102 via a port/radio 222/224/226). In one embodiment, the abstraction layer 220 maps the virtual bio sensor 216 to the appropriate sensor whether the local bio sensor 230 or a remote sensor (e.g. via radio/port 1 222) and the I/O interface 208 interacts with the received biometric information the same regardless of whether the user's biometric information is obtained locally or remotely.

As previously alluded to, the SE 102 is capable of operating using a variety of model architectures. In one embodiment, the architectural variants include stand-alone model without an external communication link (See FIG. 3), stand-alone model with an external communication link (See FIG. 4), proxy model without sharing resources (See FIG. 5), proxy with sharing resources (FIG. 6), virtual, stand-alone model without an external communication link (See FIG. 7) and virtual, stand-alone model with an external communication link (See FIG. 8). It should be noted that "external communication link" as used with respect to the model architectures refers to whether the SE 102 a communications link exists with an external host device 120.

Figure 3:
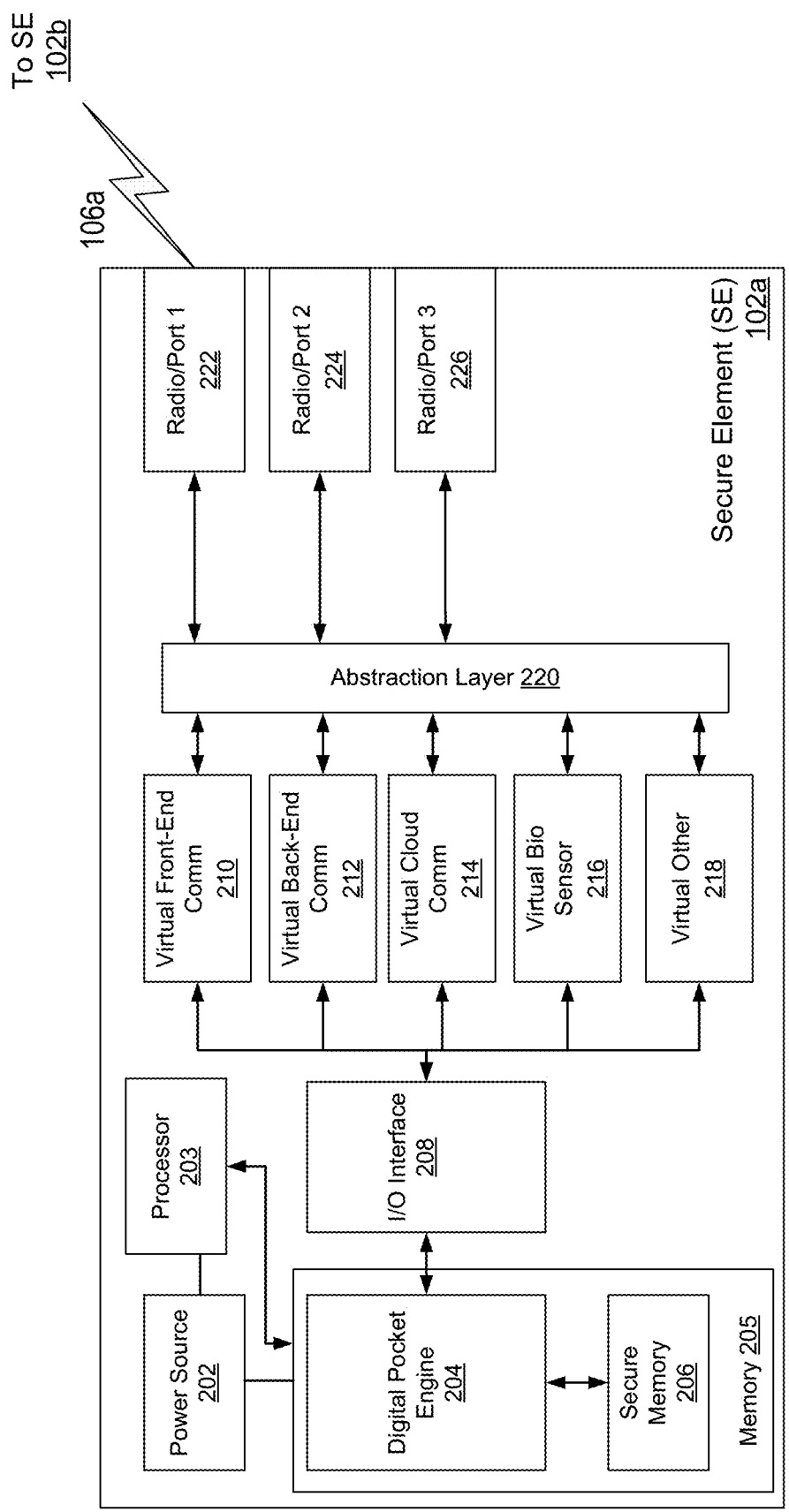
FIG. 3 is a block diagram illustrating a stand-alone model variant of the secure element architecture according to one embodiment.
Figure 4:
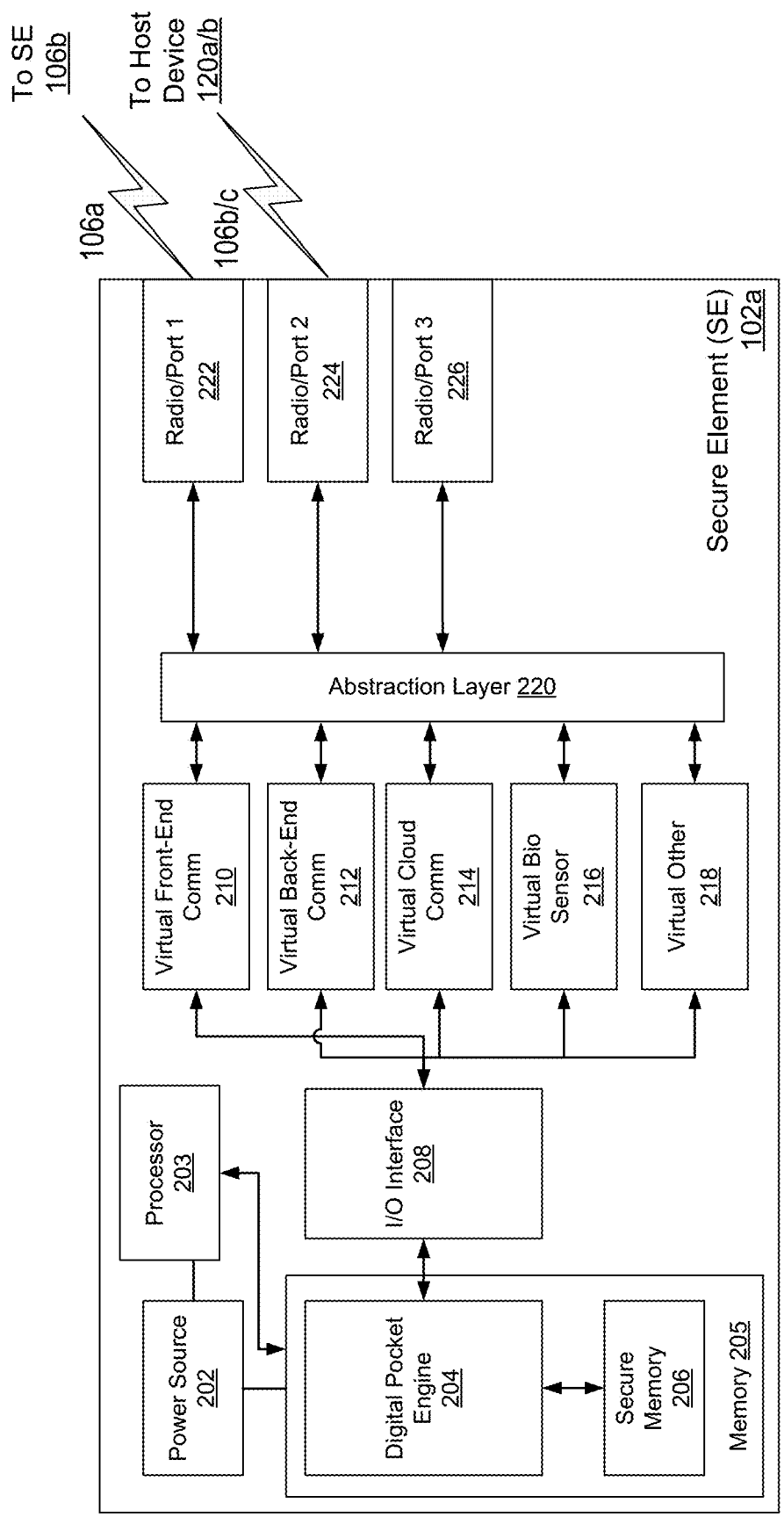
FIG. 4 is a block diagram illustrating a stand-alone model variant of the secure element architecture according to another embodiment.
Figure 5:
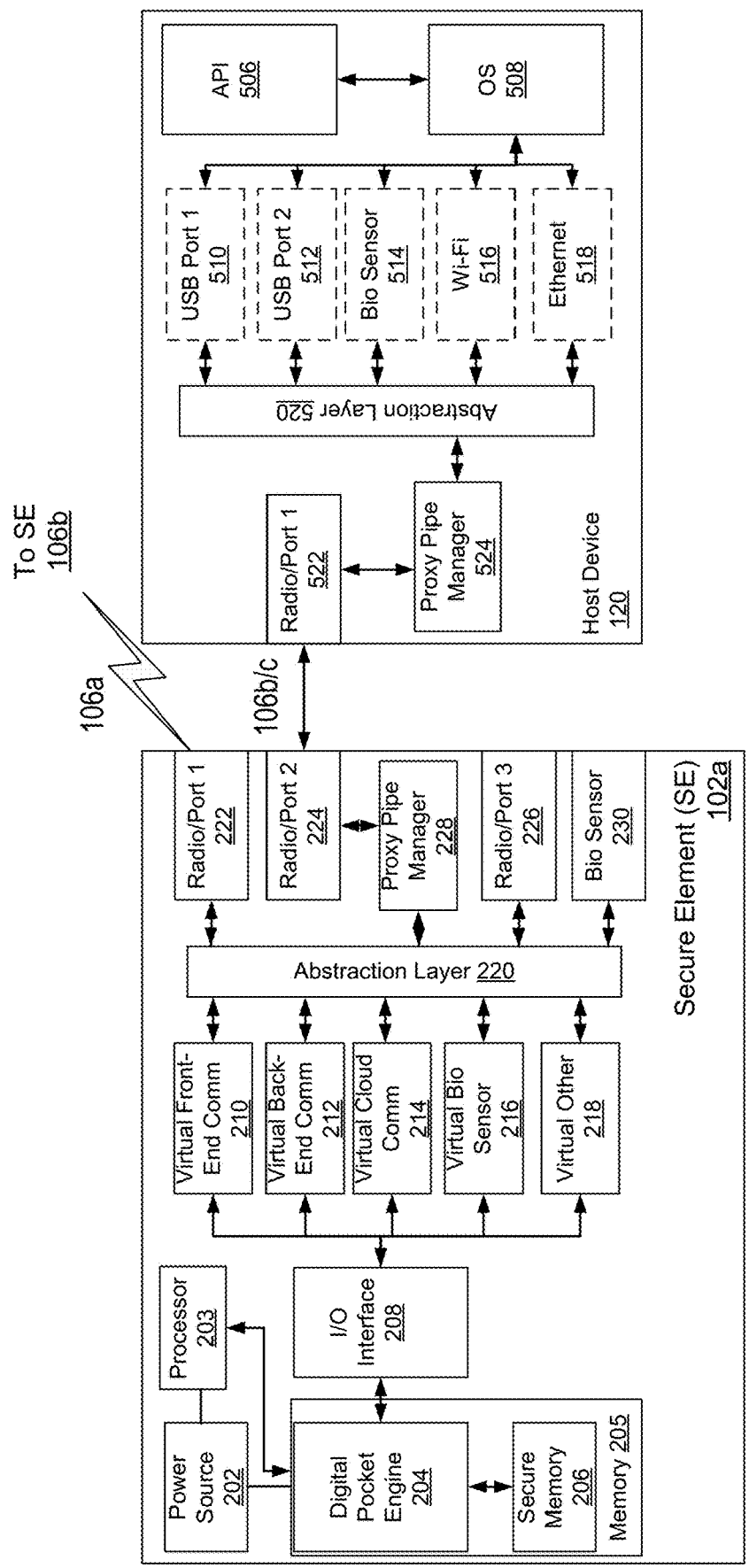
FIG. 5 is a block diagram illustrating a proxy model variant of the secure element architecture according to one embodiment.
Figure 6:
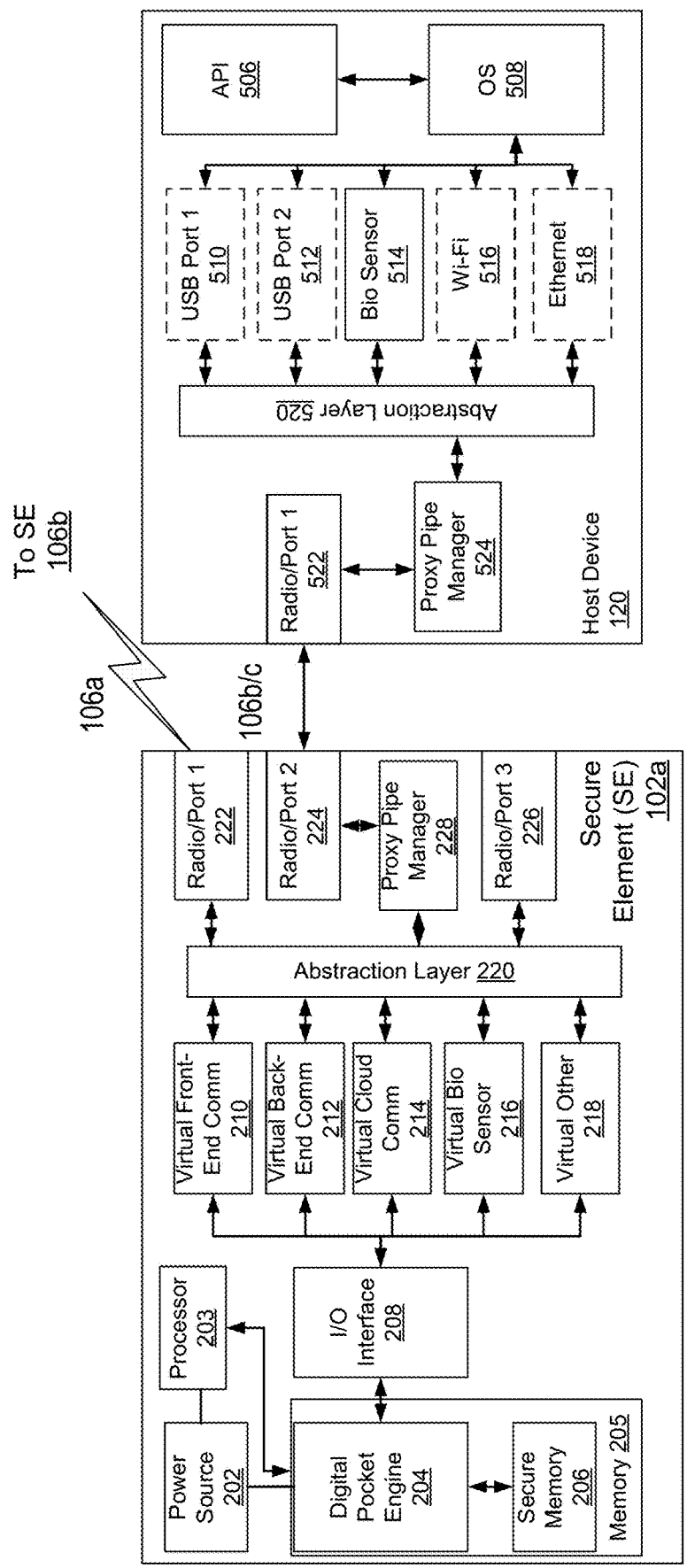
FIG. 6 is a block diagram illustrating a proxy model variant of the secure element architecture according to another embodiment.
Figure 7:
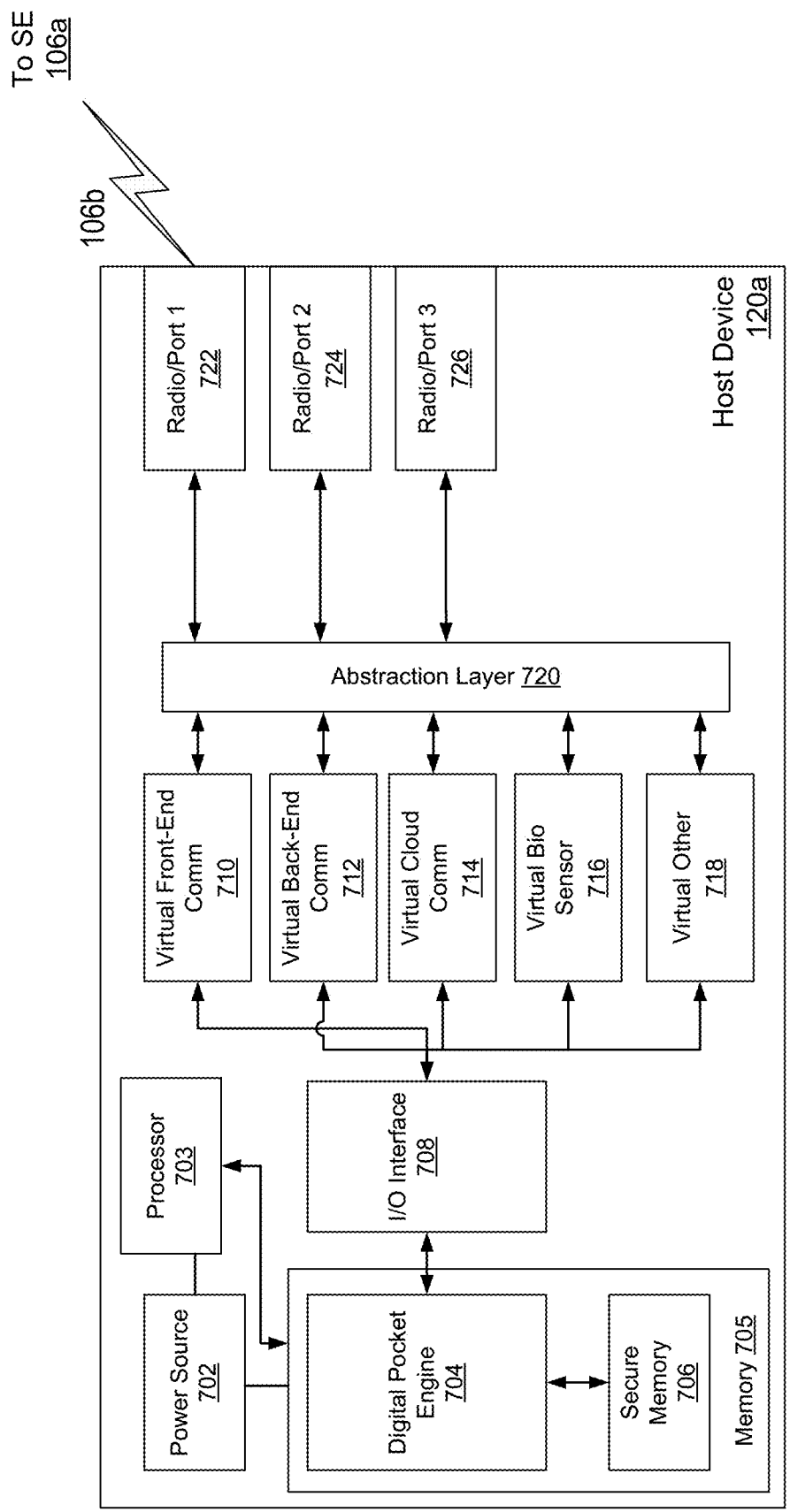
FIG. 7 is a block diagram illustrating a virtual model variant of the secure element architecture according to one embodiment.
Figure 8:
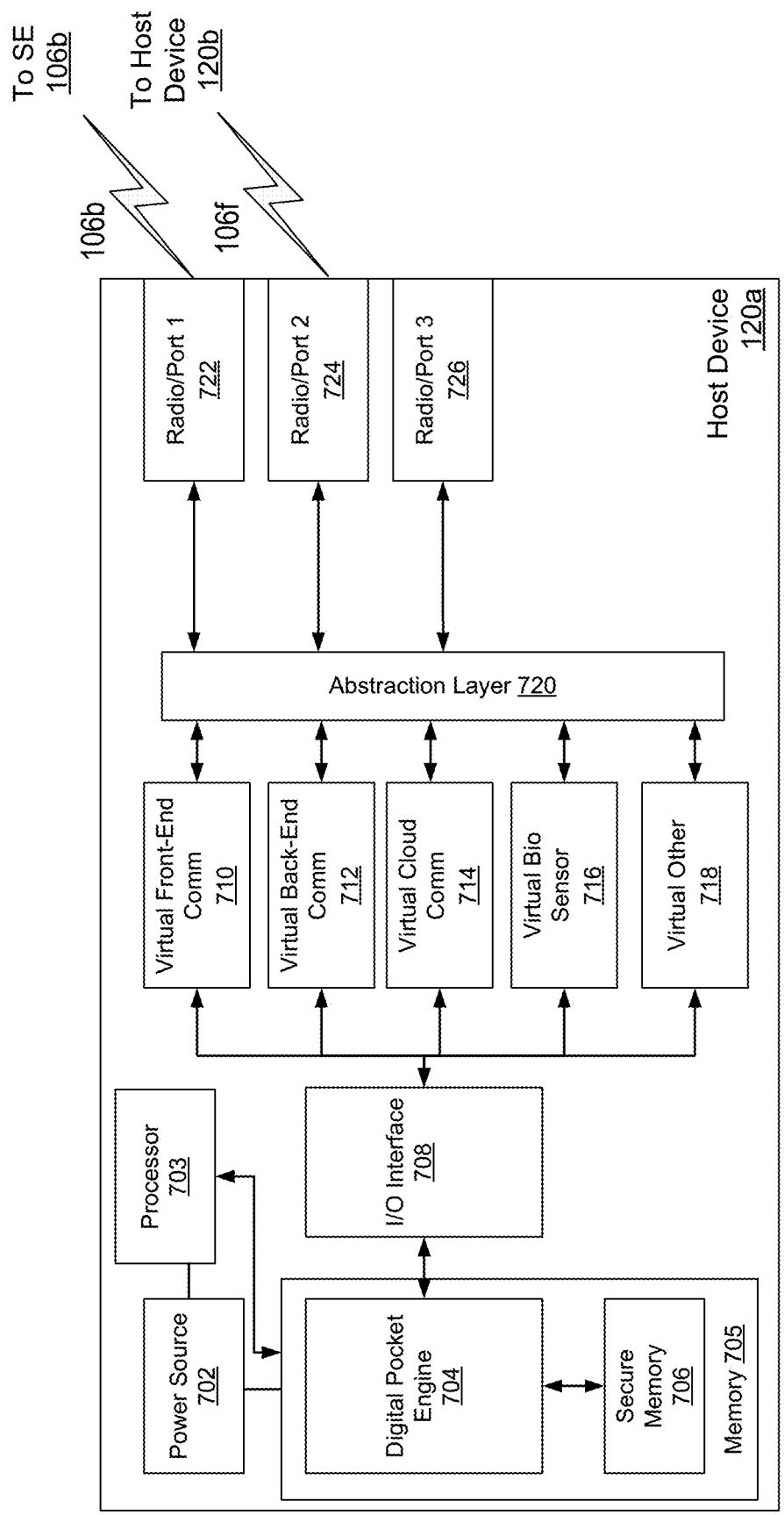
FIG. 8 is a block diagram illustrating a virtual model variant of the secure element architecture according to another embodiment.

FIG. 3 is a block diagram illustrating a stand-alone model without an external communication link variant of the secure element architecture according to another embodiment. FIG. 4 is a block diagram illustrating a stand-alone model with an external communication link variant of the secure element architecture according to another embodiment. FIG. 5 is a block diagram illustrating a proxy model without sharing resources variant of the secure element architecture according to one embodiment. FIG. 6 is a block diagram illustrating a proxy model with sharing resources variant of the secure element architecture according to another embodiment. FIG. 7 is a block diagram illustrating a virtual model without an external communication link variant of the secure element architecture according to one embodiment. FIG. 8 is a block diagram illustrating a virtual model with an external communication link variant of the secure element architecture according to another embodiment. See Appendix A.

Before discussing the variants of the secure element architecture, it is worth mentioning that, regardless of the secure element architecture, the SE 102 is able to perform the same core functionality including, multi-factor/multi-type authentication with or without biometrics and with or without utilizing a cloud-based central registry, secure access control, secure transactions, location tracking, and secure data storage services.

Referring now to FIGS. 3 and 4, in the stand-alone model architecture, the SE 102 uses its own, local resources and logic to perform the core, functionalities such as multi-factor/multi-type authentication with or without biometrics and with or without utilizing a cloud-based central registry, secure access control, secure transactions, location tracking, and secure data storage services. When the SE 102 uses this architecture, the abstraction layer 220 maps the virtual resources 210, 212, 214, 216, 218 thru to the SE's 102 (local) sensors, radios, and ports.

Referring now to FIGS. 5 and 6, in the proxy model architecture, according to one embodiment, the host device 120 may control, access and interact with the SE 102. For example, an application on the host device 120 may control the SE 102 to authenticate the user, and upon successful authentication of the user, use information of the SE 102's e-wallet (e.g. a credit line) to conduct a financial transaction on behalf of the host device 120. In the proxy model architecture, according to one embodiment, the SE 102 may control, access and interact with the host device 120. For example, the SE 102 may independently authenticate a user biometrically and/or using a central registry and lock/unlock a door, an automobile, or any number of other associated host devices 120. In the proxy model architecture, according to one embodiment, the host device 120 and SE 102 may share (virtualize) a resource of the host device 120. For example, assume the host device 120 has a sensor that the SE 102 does not (e.g. a retinal scanner); in one embodiment, the proxy model architecture allows that sensor of the host device 120 to serve its role as if directly built into the SE 102. Therefore, the proxy model architecture opens up many new roles and capabilities.

Referring now to FIGS. 7 and 8, in the virtual, stand-alone model architecture, the host device 120 installs software (not shown) and the software provides virtualized SE functionality, i.e., the virtual SE software uses the host device's 120 sensors, ports, and memory to create what appears to be a stand-alone SE to any other device interacting with it. This virtual architecture may be useful for host devices 120 such as existing smartphones, tablets and other computing devices where convenience and ease are more important than maximized security.

A distinction between the proxy model architecture and the virtual, stand-alone model architecture is the location of the SE's secure memory 206 and SE-to-SE radio. The proxy model architecture maintains these elements in the SE 102 device, but in the virtual, stand-alone model architecture, these elements are included in the host device 120. An advantage of the stand-alone and proxy model architectures is that the SE related data is in the SE 102 and separate from the host device 120. This makes upgrading a host device (e.g. a smartphone) a non-issue as the user's data (e.g. biometrics and other secure data such as the data from the phone's applications, contact list, etc.) is stored on the SE 102 and not on the host device 120. Therefore, a user need only install the SE driver 122 on the new host device 120 and associate the SE 102 with the new host device 120. In one embodiment, the SE 102 storing other secure data may allow a user to use another individual's device without worrying about security. For example, in one embodiment, the user's contact list is stored to the SE 102, so when the user picks up any host device 120 with the SE driver 122 installed, the user can access that contact list on the host device 120, and perhaps even place a call, text, retrieve data using his/her phone plan and billing information.

The SE 102 may use different secure element architectures at different times in different scenarios, sometimes referred to as a balanced model. For example, in one embodiment, the SE 102 could act use the stand-alone architecture to act as a purchaser in a first transaction and use the proxy architecture to act as a merchant in a second transaction. In another example, in one embodiment, the balanced model allows two SEs 102 (e.g. a GSE and a PSE) to participate in a single transaction. Thus, the SE 102 may fulfill the roles of both the mobile component and stationary component, which typically are distinct, dedicated devices in other systems and often in those other systems the mobile component may not directly communicate with a host device, but must communicate with the stationary component that is integrated into or coupled to a host device.

Figure 9:
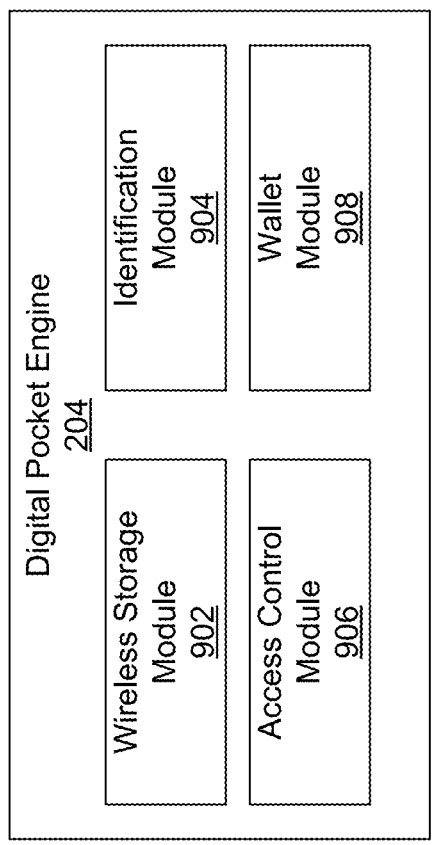
FIG. 9 is a block diagram illustrating an example of a digital pocket engine according to one embodiment.

FIG. 9 is a block diagram illustrating an example of a digital pocket engine 204 according to one embodiment. In one embodiment, the digital pocket engine 204 includes a wireless storage module 902, an identification module 904, an access control module 906 and a wallet module 908. In one embodiment, the modules of the digital pocket engine 204 are coupled to each other via a bus (not shown). Persons having ordinary skill in the art will recognize that some of the modules could run as separate applications on a SE 102.

The wireless storage module 902 can be software including routines for enabling the SE 102 to act as a wireless, portable data store. In some embodiments, the wireless storage module 902 can be a set of instructions executable by the processor 203 of the SE 102 to provide the functionality described below for wireless, portable data storage. In some embodiments, the wireless storage module 902 can be stored in the memory 205 of the SE 102 and can be accessible and executable by the processor 203. In some implementations, the wireless storage module 902 can be adapted for cooperation and communication with the processor 203 and other components of the SE 102.

Existing thumb drives must be physically connected (e.g. using a USB port) to a host device 120 (e.g. a personal computer) in order to access or modify the data stored on the thumb drive. Such devices are less than ideal. For example, a user must physically interact with the thumb drive to retrieve the thumb drive from a pocket, locate a compatible physical connection (e.g. a USB port) on the host device 120 if there even is one, orient the physical connections of the thumb drive to that of the host device 120 and create the physical connection. Such interactions may be inconvenient for a number of reasons. For example, the user has many/large/full pockets and must sift through the contents to locate the thumb drive; the physical connections of the host device 120 may be inconveniently located (e.g. on the back of a personal computer tower located under a desk), and the thumb drive may be left behind or forgotten by the owner when the owner is finished. In some embodiments, the SE 102 and the functionality provided at least in part by the wireless storage module 902 beneficially reduce or eliminate one or more of the inconveniences associated with existing thumb drives.

The wireless storage module 902 provides wireless, portable data storage functionality. In one embodiment, the wireless storage module 902 of the SE 102 determines whether the SE 102 is in proximity to an associated host device 120, i.e., a host device 120 with which the SE has a relationship or is "associated" with. For example, assume a first user owns SE 102*b* and host device 120*b* and has associated SE 102*b* with host device 120*b*; in one embodiment, the wireless storage module 902 determines when SE 102*b* is in proximity to host device 120*b*.

In one embodiment, the proximity is determined based on a metric satisfying a threshold, for example, a signal strength of a wireless connection between the SE 102 and the host device 120. In one embodiment, the proximity may be a variable threshold. For example, so that a SE 102 needs to be closer to a first host device 120 than a second host device 120 to be determined proximate. Such an embodiment, may beneficially provide greater security by requiring that a user be closer to a host device 120 that is portable or used publicly (e.g. a cellular phone) than to a stationary or private host device (e.g. a desktop computer in a user's private bedroom). Depending on the embodiment, the proximity threshold varies based on one or more of any number of factors including, for example, a user preference, the host device 120, the type of host device 120, etc.

In one embodiment, wireless storage module 902 wirelessly mounts the memory 205 of the SE 102 or a portion thereof as storage drive on the associated host device 120 in proximity. In one embodiment, the wireless storage module 902 automatically mounts at least a portion of the SE 102 memory 205 as a drive of the host device 120 responsive to determining the host device 120 is within proximity. In one embodiment, the wireless storage module 902 may require one or more triggers prior to mounting, for example, to prevent potential repeated, unwanted or unnecessary mounting as the user walks with a SE 102 in and out of proximity to the host device 120. Examples of triggers may include biometric authentication (e.g. the user swiping his or her finger on a fingerprint reader), a duration of time for the SE 102 to be in proximity being satisfied (which may or may not be user adjustable), etc.

In one embodiment, the mounted portion of the SE's memory 205 is treated by the host device 120 as if it was an internal drive or a physically connected thumb drive and allows data (e.g. files, documents, etc.) to be read from and written to the memory 205 as such while the SE 102 remains in the user's pocket, purse, backpack, etc. Therefore, the wireless storage module 902 revolutionizes the carrying of digital content by making the process easier, quicker and more secure.

In one embodiment, the wireless storage module 902 may interact with the identification module 904 to require biometric authentication. For example, the identification module 904 of the SE 102 may authenticate a fingerprint before mounting the portion of the memory 205 or allowing a user to access the mounted portion of the memory 205.

The identification module 904 can be software including routines for performing authentication. In some embodiments, the identification module 904 can be a set of instructions executable by the processor 203 of the SE 102 to provide the functionality described below for authentication. In some embodiments, the identification module 904 can be stored in the memory 205 of the SE 102 and can be accessible and executable by the processor 203. In some implementations, the identification module 904 can be adapted for cooperation and communication with the processor 203 and other components of the SE 102.

In one embodiment, the identification module 904 manages identifying information, e.g., biometrics, name, address, phone number, driver's license, passport, social security number, business card, insurance cards, etc., stored on the SE 102, thereby potentially and beneficially eliminating the need for the owner user to carry such items in a wallet or pocket. In one embodiment, as described above with reference to the proxy model architecture, the identification module may perform authentication on behalf of the host device 120 or application thereof.

In one embodiment, the identification module 904 performs authentication. In one embodiment, the identification module 904 performs authentication using one or more factors including, for example, one or more of a device, a user, an application and a registry or other trusted third party. Upon successful authentication, the SE 102 establishes a secure, wireless communication channel 106 over which data may be securely exchanged.

In one embodiment, the identification module 904 performs device authentication (i.e. SE-to-SE authentication). See Appendix B. For example, in one embodiment, when SEs (e.g. SE 102a and SE 102b) detect one another they automatically establish a secure, wireless communication link (e.g. 106a) and exchange information and based on that information confirm the other device is a valid SE 102.

In one embodiment, the identification module 904 performs user authentication (i.e. SE-to-User authentication). See Appendix B. For example, in one embodiment, the identification module 904 may require that the user provide biometric information by interaction with a bio sensor 230 and authenticate the user the identification module determines that the biometric information of the user matches that of the owner of the SE 102 stored during setup of the SE 102.

In one embodiment, the identification module 904 performs application authentication (i.e. SE-to-App authentication). See Appendix B. For example, in one embodiment, the identification module 904 sends data to an application on the host device 120 for the application to authenticate that the SE 102 is a valid device. In another example, in one embodiment, the identification module 904 may receive data (e.g. a certificate or checksum) from an application of the host device 120 that verifies the application is valid (e.g. is valid and has not been altered).

In one embodiment, the identification module 904 performs registry authentication (i.e. SE-to-Registry authentication). See Appendix B. For example, in one embodiment, the identification module 904 sends data to a registry (e.g. a central registry) and receives from the registry a determination whether the SE 102 is in good standing, is lost, stolen, etc.

The authentication performed by the identification module 904 may depend on a service the SE 102 is providing. In one embodiment, services include private services and external services. For example, in one embodiment, private services are further categorized as owner/personal (OP) and multi-party (MP) and external services include a third party trusted (TPT) category. See Appendix B.

In one embodiment, Private-OP services are services that require the owner of the SE 102 to accept. In one embodiment, an owner accepts a Private-OP service by being biometrically authenticated. For example, the user swipes his or her finger on the fingerprint reader of their SE 102 and upon authentication, the service is available or provided. Examples of Private-OP services may include storing or accessing private files on the SE 102 or host device 120 or accessing a host device 120 (e.g. via the wireless storage module 902); and accessing devices, equipment, doors, websites, applications, filling out online forms, etc. (e.g. via the access control module 906).

In one embodiment, Private-MP services are services that require multiple parties to accept. In one embodiment, the multiple parties may accept the Private-MP service by being biometrically authenticated. For example, each user swipes his or her finger on the fingerprint reader of his/her own SE 102 (or depending on the embodiment, another user's SE 102 and the biometric information is exchanged for authentication) and upon biometric authentication of each user by the user's SE 102, the service is available or provided. Examples of Private-MP services may include storing or accessing private files on the SE 102 or host device 120 or accessing a host device 120 (e.g. via the wireless storage module 902); and accessing devices, equipment, doors, websites, applications, filling out online forms, etc. (e.g. via the access control module 906).

In one embodiment, Public-TPT services are services that require acceptance by a trusted third party. In one embodiment, the service is accepted/approved when an owner provides biometric information at the accepting party's SE 102. For example, assume user 1 wants to approve a secure file transfer to user 2 (i.e. the accepting party); in one embodiment, user 1 swipes his finger on the fingerprint reader of user 2's SE 102. In another example, a user swipes his or her finger on the fingerprint reader of an SE 102 associated with the trusted third party (e.g. an SE 102 belonging to a notary agent of the trusted third party). Examples of Public-TPT services may include transferring secure files (e.g. via the wireless storage module 902), performing secure transactions (e.g. via wallet module 908), and accessing public devices, equipment, doors, etc. (e.g. via the access control module 906).

The access control module 906 can be software including routines for enabling access control. In some embodiments, the access control module 906 can be a set of instructions executable by the processor 203 of the SE 102 to provide the functionality described below for access control. In some embodiments, the access control module 906 can be stored in the memory 205 of the SE 102 and can be accessible and executable by the processor 203. In some implementations, the access control module 906 can be adapted for cooperation and communication with the processor 203 and other components of the SE 102.

The access control module 906 enables the SE 102 to act as a proximity based key allowing access when in proximity and disallowing access when the SE 102 is not in proximity. The access control module 906 and the functionality provide thereby allows the SE 102 to replaces logical keys (e.g. username and passwords, PINs, etc.) and physical keys (e.g. car key fob, home and office keys including RFID keys, Bluetooth key, smart cards, etc.)

In one embodiment, the access control module 906 provides automated password management. In one embodiment, the access control module 906 automatically and invisibly fills in usernames and passwords when visiting websites, using apps, etc.

In one embodiment, the access control module 906 enables the SE 102 to act as a wireless, proximity based key to access and secure an associated host device 120 or other asset. Such access control beneficially makes a lost or stolen host device 120 unusable. Depending on the embodiment, the access control module 906 may secure and provide access to a host device 120 in one or more ways. In one embodiment, the operating system of the host device 120 may not be able to boot without the SE 102 in proximity. In one embodiment, the hard drive or other memory of the host device 120 may be encrypted and unusable when the SE 102 is not in proximity to provide the decryption key. In one embodiment, the access control module 906 automatically provides a username and password to log into an account on the host device 120. For example, the access control module 906 auto completes the windows login on a host device 120 running the windows platform.

The proximity used for access control may be the same proximity as that used by the wireless storage module 902 or a different proximity depending on the embodiment. In one embodiment, the access control module determines proximity for access control similar to what is described with reference to the wireless storage module 902 above.

The wallet module 908 can be software including routines for enabling the SE 102 to serve as an e-wallet and participate in financial transactions. In some embodiments, the wallet module 908 can be a set of instructions executable by the processor 203 of the SE 102 to provide the functionality described below to serve as an e-wallet and participate in financial transactions. In some embodiments, the wallet module 908 can be stored in the memory 205 of the SE 102 and can be accessible and executable by the processor 203. In some implementations, the wallet module 908 can be adapted for cooperation and communication with the processor 203 and other components of the SE 102.

The wallet module 908 may store and manage electronic versions of one or more of the SE 102 owner's credit cards, debit cards, loyalty cards, membership cards, coupons and rewards cards, thereby eliminating the user's need to carry those items in his/her pocket or wallet.

In one embodiment, the wallet module 908 completes financial transactions. For example, the wallet module may complete a financial transaction responsive to the identification module 904 receiving approval and performing biometric authentication. In one embodiment, as described above with reference to the proxy model architecture, the wallet module 908 may perform financial transactions on behalf of the host device 120.

In one embodiment, the wallet module 908 and identification module 904 enable biometrically triggered transactions. See Appendix A. In one embodiment, an SE 102 will automatically detect and initiate a connection to another SE 102 in range and, as mentioned, certain transactions may require a user to use a bio sensor of a host device 120 or another SE 102 (i.e. not the PSE of the user). When multiple SE 102 devices are within range of the device receiving the biometric information, the issue becomes determining which SE 102 is the SE 102 of the user that provided the biometric information in order to proceed with the transaction. In one embodiment, a SE 102 automatically and algorithmically matches received biometric information to the correct SE 102 for authentication. In one embodiment, when an SE 102 detects another SE 102 in range, the two SEs 102 automatically connect and communicate. In one embodiment, an SE 102 that is a PSE may send a biometric sample to the other SE 102 upon connecting.

As mentioned above, a PSE may store biometric information of the PSE's owner (e.g. data representing the owner's fingerprint). In some embodiments, the PSE also stores a sample, i.e. a subset, of that biometric information (e.g. data representing a portion of the owner's fingerprint). The biometric information and biometric sample may be created during setup of the PSE. In one embodiment, the biometric information and biometric sample may be created using one-way hash so that the user biometrics (e.g. fingerprint) cannot be recreated from them.

In one embodiment, a SE 102 may buffer the biometric samples it receives from other SEs 102 along with information identifying which SE 102 each biometric sample belongs to (e.g. by associating the sample with a unique identifier of the sending SE 102). When a bio sensor of the buffering SE 102 is used and receives biometric information, in one embodiment, the SE 102 compares the biometric information to the buffered biometric samples and, depending on the embodiment, its own biometric sample when the SE 102 is a PSE and determines whether the received biometric information matches a sample. When a match is made the biometric information received from the bio sensor is sent to the identified SE 102 where the biometric information is authenticated by the identified SE 102. Upon authentication, the SE 102 completes a transaction.

Such biometrically triggered transactions beneficially allow a user to initiate and complete a transaction merely by interacting with a bio sensor. For example, assume an individual with a PSE is checking out at a store and there is a line of other individuals each carrying their own PSE. The individual checking out may interact with a bio sensor on a GSE at the point of sale (e.g. swipe his or her finger) and automatically initiate and complete the payment process without the individual having to retrieve his/her PSE or take any other actions.

Figure 10:
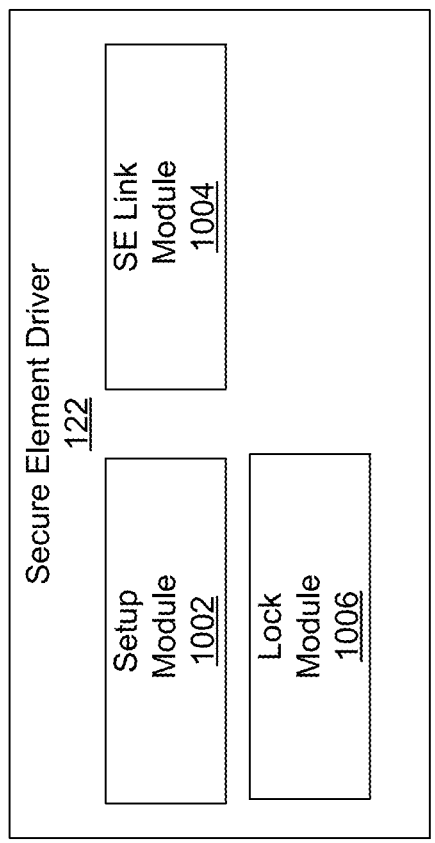
FIG. 10 is a block diagram illustrating an example of a secure element driver according to one embodiment.

FIG. 10 is a block diagram illustrating an example of a secure element driver 122 according to one embodiment. The SE driver 122 may be a software application installed onto the host device 120. In one embodiment, the SE driver 122 is platform agnostic and may be installed on any popular host device 120 platform, for example, Windows, Mac, Android, iOS, Blackberry, etc. In another embodiment, multiple SE drivers 122 for various host device 120 platforms may exist and the appropriate SE driver 122 for the host device's platform is installed on the host device 120. Regardless of the embodiment, the SE 102 functions identically regardless of the host device's platform and is occasionally said to be platform agnostic or device independent. The platform independence and the implementation of the SE as either a separate device 102 or as a virtual SE on the host device beneficially provide for a system with unprecedented versatility. For example, the SE system 100 may be implemented with currently existing host devices 120 without modification to their hardware. For example, the SE 102 herein may work with a current smartphone, tablet and laptop to provide after-market proximity based access control to all without requiring any proprietary or specialized hardware being installed during manufacture of those devices.

In one embodiment, the secure element driver includes a setup module 1002, a SE link module 1004 and a lock module 1006. In one embodiment, the modules of the secure element driver 122 are coupled to each other via a bus (not shown). Persons having ordinary skill in the art will recognize that some of the modules could run as separate applications on a host device 120.

The setup module 1002 can be software including routines for setting up a SE 102. In some embodiments, the setup module 1002 can be a set of instructions executable by a processor (not shown) of the host device 120 to provide the functionality described below for setting up a SE 102. In some embodiments, the setup module 1002 can be stored in a memory (not shown) of the host device 120 and can be accessible and executable by its processor (not shown). In some implementations, the setup module 1002 can be adapted for cooperation and communication with the processor (not shown) and other components of the host device 120 and with the SE 102.

Once the SE driver 122 is installed, an owner of a SE 102 may associate his/her SE 102 with the host device 120. In one embodiment, a host device 120 may be associated with one or more SE 102s. An association between a host device 120 and an SE 102 is a relationship that allows some of the functionality described above. For example, proximity based access to the host device 120 and wireless data access of data stored on the SE 102 by the host device 120 both require that the SE 102 and host device 120 be associated according to one embodiment and will not occur absent the association.

The setup module 1002 allows a user to setup a new SE 102. For example, in one embodiment, the setup module 1002 provides a user a wizard and/or GUIs which guide the user in the SE 102 setup and obtain the required information. For example, the setup module 1002 prompts the user to enter basic info and swipe a bio sensor. The biometric information is permanently and securely stored on the SE 102 (e.g. in a write only portion of the secure memory 206) and subsequently used for biometric authentication. Once SE 102 is setup, a user need only carry (e.g. in a pocket) the SE 102 and swipe his or her finger when proof of ownership is required.

In one embodiment, the setup module 1002 may include software for implementing a virtual SE on the host device 120 as discussed with reference to the virtual model architecture. In another embodiment, the software for implementing a virtual SE on the host device 120 is software (not shown) that is separate from the SE driver 122 and the setup module 1002.

The SE link module 1004 can be software including routines for extending the functionality and capabilities of an SE 102 to a host device 120. In some embodiments, the SE link module 1004 can be a set of instructions executable by the processor (not shown) of the host device 120 to extend the functionality and capabilities of an SE 102 to the host device 120. In some embodiments, the SE link module 1004 can be stored in the memory (not shown) of the host device 120 and can be accessible and executable by the processor (not shown). In some implementations, the SE link module 1004 can be adapted for cooperation and communication with the processor (not shown) and other components of the host device and with the SE 102.

The link module 1004 extends the capabilities of the SE 102 to an associated host device 120. In one embodiment, the link module 1004 contributes to enabling the proxy model architecture discussed above. For example, the link module 1004 contributes to enabling the host device 120 to control the SE 102 and/or contributes to enabling a SE 102 to share a resource of the host device 120 as if the resource was local to the SE.

In one embodiment, once a SE 102 is linked to an associated host device 120, the SE 102 appears to the host device's application(s) as if the SE 102 was built into the host device 120 similar (from the host device's perspective) to any other sensor or hardware of the host device 120. In one embodiment, the link module 1004 achieves this extension of capabilities by using its own abstraction layer on the host device 120 side. For example, referring to FIGS. 5 and 6, the abstraction layer 520 may map the SE 102 connected wirelessly via radio/port 1 522 to locally available resources. For example, the abstraction layer 520 may map the secure element to USB port 1 510, so that the SE 102 appears to the host device 120 and its applications the same a thumb drive plugged into USB port 1 of the host device 120. The proxy pipe managers 228, 524 act as conduits over which the shared resources are shared and managed and make the sharing of resources transparent to the SE 102 and host device 120.

The lock module 1006 can be software including routines for enabling the SE 102 to act as a wireless, portable data store. In some embodiments, the lock module 1006 can be a set of instructions executable by the processor (not shown) of the host device 120 to provide the functionality described below for wireless, portable data storage. In some embodiments, the lock module 1006 can be stored in the memory (not shown) of the host device 120 and can be accessible and executable by the processor (not shown). In some implementations, the lock module 1006 can be adapted for cooperation and communication with the processor (not shown) and other components of the host device S and with the SE 102.

The lock module 1006 enables an SE 102 associated with the host device 120 to perform some of the functionality described above with reference to the digital pocket engine 204. For example, the lock module 1006 cooperates with the access control module 906 of the SE 102 so that the SE 102 acts as a digital key needed for a user to interact with and access the host device 120. When the SE 102 is in proximity, the host device 120 works. When the SE 102 is not in proximity, the host device 120 does not work. Therefore, if the host device (e.g. a cell phone) is lost or stolen, the data thereon is protected and the host device 120 is useless to anyone who finds it. In some embodiments, sensitive data or other user data is stored on the SE 102, so there is no data lost in the preceding scenario. The user may replace the lost or stolen host device 120 associate it with his/her SE 102 and be back to the status quo before the loss or theft.

It should be recognized that many of the features and functions described herein require an SE 102 and host device 120 to cooperate and communicate. For example, the remote wireless storage device capability and proximity based access to the host device 120 are two functions that require the SE 102 and the host device 120 to cooperate. The preceding description attributes certain functionality to module(s) on a specific device. For example, proximity determination is discussed with reference to one or more modules of the SE 102. However, it should be recognized that some functionality may be divided differently among the SE 102 and host device 120. For example, in one embodiment, the lock module 1006 may determine proximity in addition to or instead of the access control module 906.

Figure 11B:
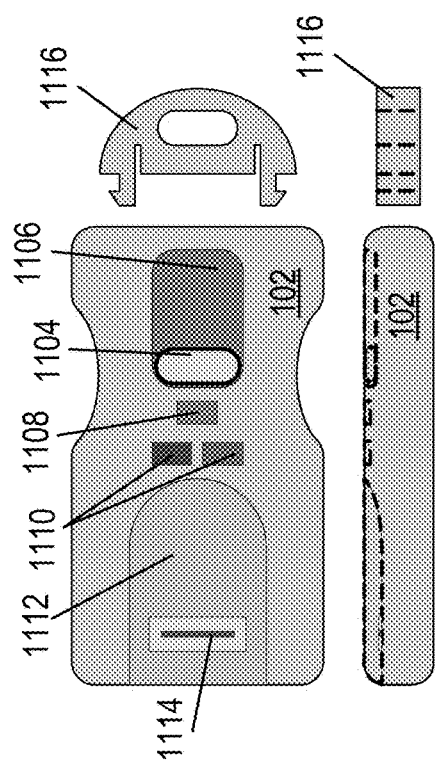
FIGS. 11A-C are illustrations of a secure element according to one embodiment.
Figure 11C:
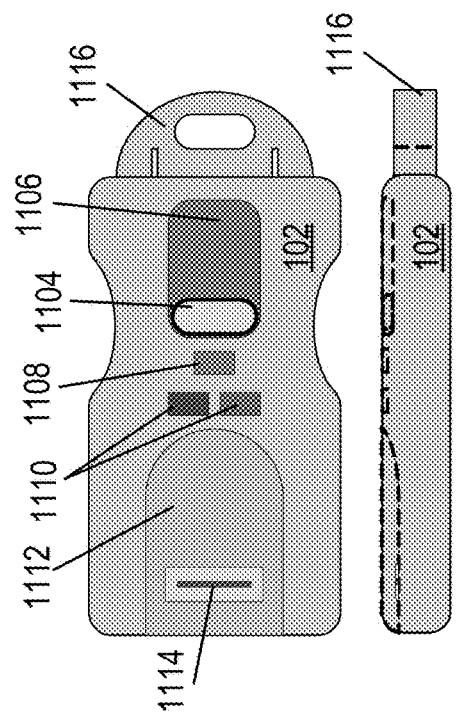
Figure 11A:
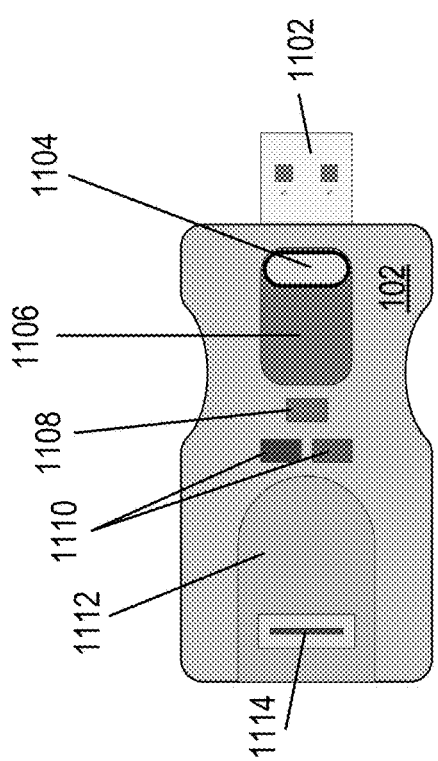

FIGS. 11A-C are illustrations of a secure element 102 according to one embodiment. Referring to FIG. 11A-C, the illustrated SE 102 embodiment includes a male USB port 1102, which may be extended (as seen in FIG. 11A) or retracted (and is not visible in FIGS. 11B and 11C) when a user slides the USB actuator pad 1104 in a groove 1106 from a first position (as seen in FIG. 11A) to a second position (as seen in FIGS. 11B and 11C). The USB port 1102 may be used to charge a rechargeable battery (e.g. Li ion) of the SE 102, update the SE's 102 software including firmware, and utilize the SE 102 without a wireless connection (e.g. as a traditional thumb drive, a general security element with a biometric reader for the host device 120, etc.).

The illustrated SE 102 embodiment also includes indicator lights 1108 and 1110. For example, an indicator light 1108 (e.g. a blue LED) to indicate whether the SE 102 is charging or fully charged (e.g. when plugged into a USB charging cable or USB port on a host device 120) and one or more indicator lights 1110 to indicate whether an authentication or portion thereof was successful (e.g. a green LED to indicate a successful biometric reading and a red LED light to indicate a biometric read failed). The illustrated SE 102 embodiment also includes a fingerprint reader 1114 and a groove 1112 in the housing of the SE 102 to guide a user's finger across the fingerprint reader 1114. Referring now to FIGS. 11B-11C, an example of a USB cover/keychain connector 1116 is shown, which may be connected to the end of the SE 102 with the USB port in order to cover the USB port and provide an anchoring loop to attach the SE 102 to a lanyard, keychain or other item.

Figure 12C:
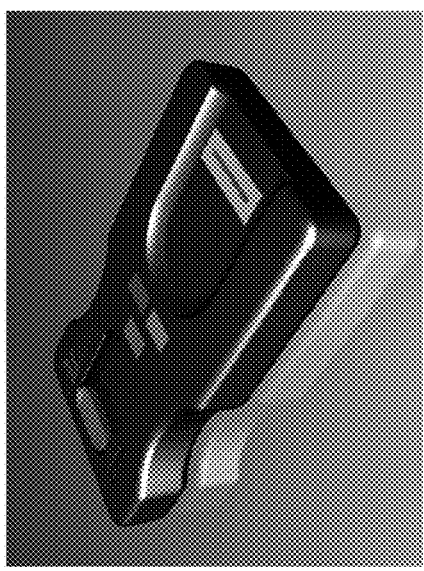
FIGS. 12A-F are illustrations of a secure element according to one embodiment.
Figure 12F:
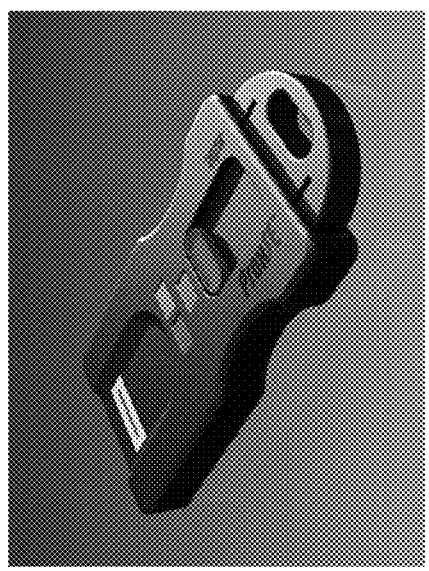
Figure 12B:
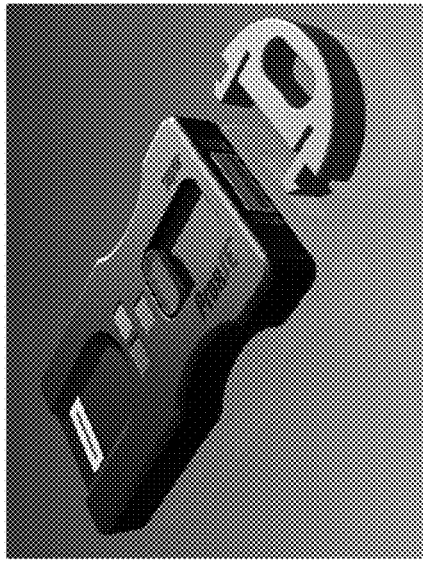
Figure 12E:
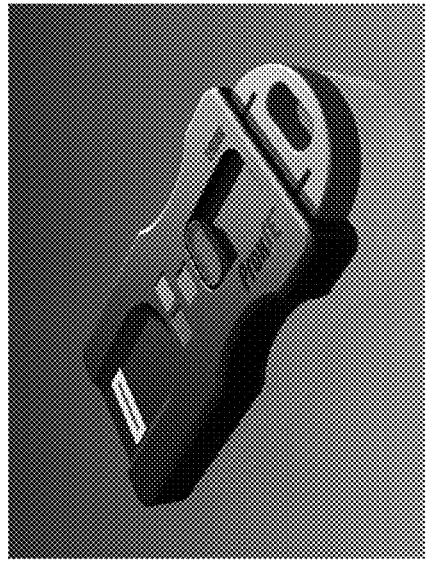
Figure 12A:
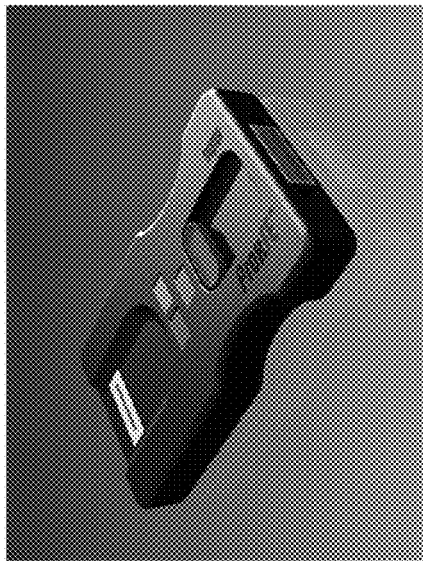
Figure 12D:
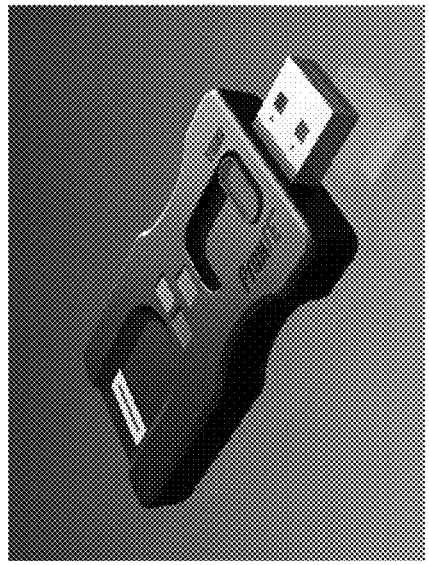

FIGS. 12A-F are illustrations of a secure element 102 according to one embodiment. FIGS. 12A-F show a SE 102 similar to that illustrated in FIGS. 11A-C, but offer a different perspective view. For example, FIG. 12D is similar to FIG. 11A, FIG. 12B is similar to FIG. 11B and FIGS. 12E and 12F are similar to FIG. 11C.

Figure 13:
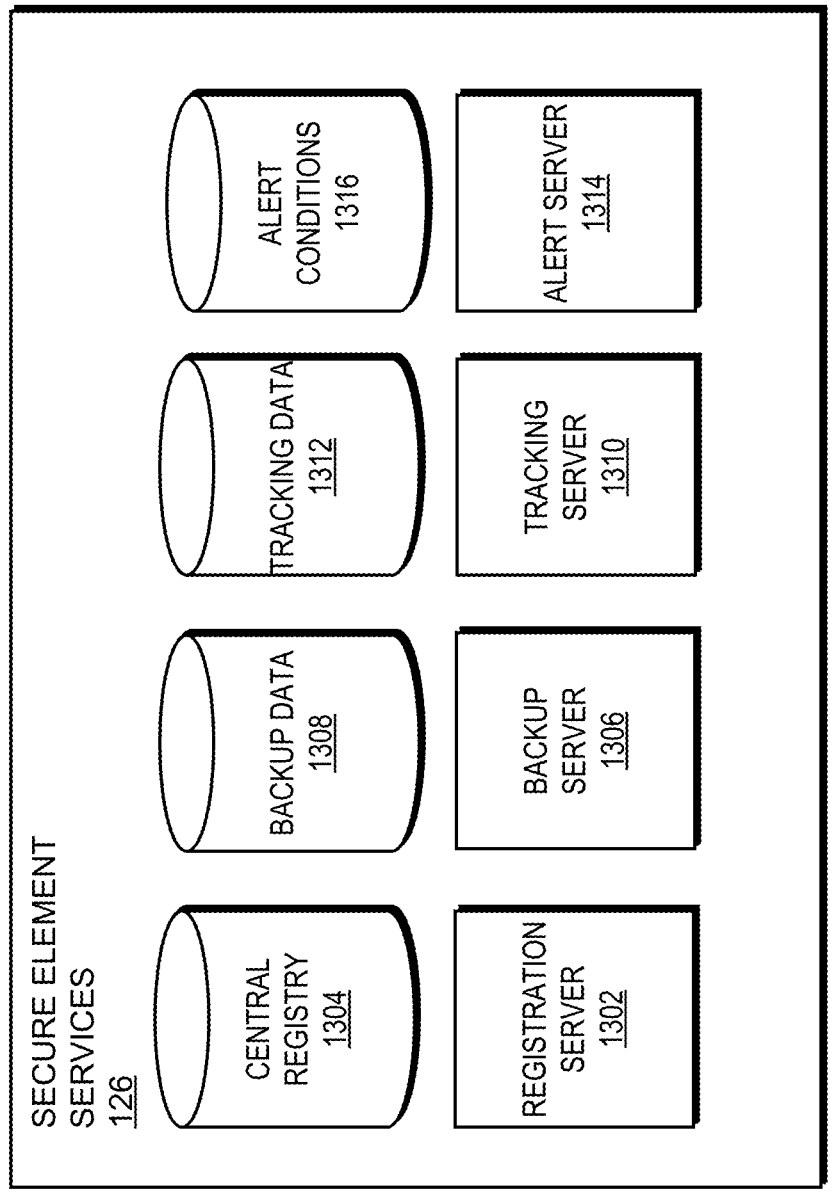
FIG. 13 is a block diagram illustrating an example of secure element services according to one embodiment.

FIG. 13 is a block diagram illustrating an example of secure element services 126 according to one embodiment. In one embodiment, the secure element services 126 provides various services related to or expanding on the functionality of the SE 102 described above. In the illustrated embodiment, the secure element services includes a registration server 1302 and central registry 1304, a backup server 1306 and backup data 1308, a tracking server 1310 and tracking data 1312, and an alert server 1314 and alert conditions. See Appendix A and B.

The registration server 1302 allows an owner of a SE 102 to register his/her SE 102. Registration may provide a number of benefits. For example, registration using a trusted third-party authority may ensure that the owner of the SE 102 and the provider of any biometric information stored to the SE 102 is who he/she purports to be. For example, in some embodiments, a notary agent may be required to witness a user's setup of an SE 102 and register the SE 102. For example, a user may be required to present government issued identification to a notary agent. The notary agent may then confirm the user's identity is consistent with the identification presented and witness the user's setup and storage of his/her biometric information onto the SE 102. In one such embodiment, when the user's biometric information is stored to the SE 102 during setup, it is unable to be subsequently altered (e.g. data based on the user's fingerprint is stored on a write once memory and is unable to be modified or overwritten). In one embodiment, a registry maintains information about the status of registered SEs 102 and may be used during authentication to enhance security. For example, the registry may indicate whether a particular SE 102 is in good standing, has been reported stolen, etc., and the registry is used during authentication to determine whether a SE 102 is in good standing. Depending on the embodiment, the registration may be to a private registry (not shown), i.e., a registry established and maintained by a private entity such as an employer, individual retailer, healthcare facility, etc. and used by that entity, or a central registry 1304, i.e., a highly-secured, centrally-located database administered by a trusted third-party organization.

The data stored by the registry may vary depending on the embodiment. In some embodiments, a registry includes a record in a database indicating that the SE 102 has been setup and registered. In some embodiment, a central register minimally includes a record for each registered SE 102, and the record indicates that the SE 102 was setup and registered by a third-party trusted authority (e.g. in the presence of/witnessed by a notary agent). Certain transactions may utilize a central registry to authenticate an SE 102 using the central registry, i.e., determine whether a SE 102 taking part in the transaction has been setup and registered by a third-party trusted authority and may choose to deny a transaction if the SE 102 has not been setup and registered with the central registry.

In one embodiment, the registry does not store any user identifying or user associated data. For example, in one embodiment, the registry stores the record including an identifier of the SE 102 and a status of the SE 102, but does not store a name or any other data associated with the owner of the SE 102. In one embodiment, a registry may store information in addition to the record. In one embodiment, the registry may store user identifying data or user associated data. For example, in one embodiment, a registry may store biometric information of the SE's owner. In one embodiment, when a registry stores biometric information of the SE's owner such as a fingerprint, the fingerprint is encrypted using an encryption key held by the SE 102. Such an embodiment may ensure that even if security of the central registry was compromised a user's biometric information could not be recreated. In one embodiment, the user's biometric information is created using a one-way hash so that the users biometric (e.g. fingerprint) cannot be recreated from biometric information even if unencrypted.

The backup server 1306 allows a SE 102's owner to backup his/her SE 102's data to the cloud where it is stored as user backup data 1308. Should a user choose to backup his/her SE 102, the backup server 1306 allows a user to select to backup the SE 102's data to the cloud, which may be beneficial should the SE 102 ever need to be replaced because of loss, damage, etc. In some embodiments, the backup server 1306 may perform a period backup automatically.

The tracking server 1310 allows an authorized user to track the movement of a SE 102 and determine the location of an SE 102. For example, a user's employer may be authorized (e.g. by the user) to track the movement of the user's SE 102 during work hours in order to perform motion studies in the employer's facilities. In another example, the owner of the SE 102 may use the tracking server 1310 to perform a location query to locate his/her misplaced SE 102.

The alert server 1314 allows users to define and store one or more alert conditions 1316 associated with a SE 102. For example, an alert condition defined to send an SMS text message to an Alzheimer's patient's primary caretaker when the SE 102 of that patient enters or leaves a specified location or has not moved for a specified period of time.

Figure 14:
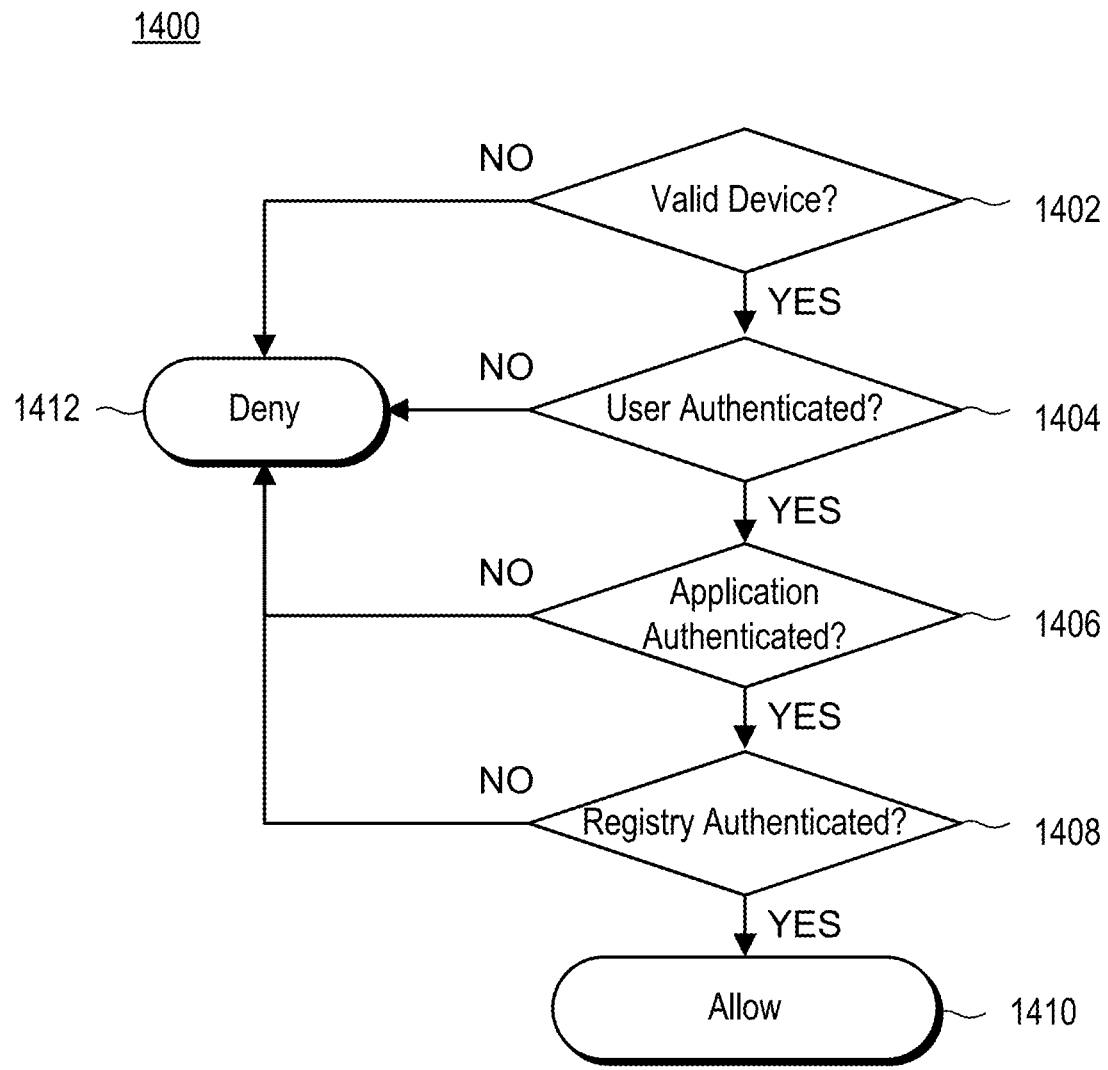
FIG. 14 is a flowchart of a method for authentication using a secure element according to one embodiment.

FIG. 14 is a flowchart of a method 1400 for authentication using a secure element according to one embodiment. In the illustrated embodiment, the authentication is performed to determine whether to allow or deny an action in the system 100. In the illustrated embodiment, the method 1400 begins at block 1402. At block 1402, the identification module 904 of a first SE 102 performs authentication to determine whether another SE 102 (e.g. a GSE at a point of sale) or host device 120 is valid. When the identification module 904 of the first SE 102 determines that the another SE 102 is valid (1402—Yes), the identification module 904 authenticates, at block 1404, the user of the first SE 102 (e.g. performs biometric authentication of the user). When the identification module 904 of the first SE 102 determines that the user is the owner or authorized user of the first SE 102 (1404—Yes), an application on the host device 120 authenticates the first SE 102 and/or the identification module 904 of the first SE authenticates an application requesting the action at block 1406. When the identification module 904 of the first SE 102 successfully authenticates the application and/or the application authenticates the first SE 102 (1406—Yes), a registry authenticates the first SE 102 at block 1410. When the registry successfully authenticates the first SE 102 (1408—Yes), a registry authenticates the first SE 102 at block 1408. The first SE 102 is in good standing (e.g. not lost, stolen, black listed, etc.) and the requested action is allowed at block 1410. Should there be a failure of device authentication (1402—No), user authentication (1404—No), application authentication (1406—No) or registry authentication (1408—No), the action is denied at block 1412 according to the embodiment.

Figure 15:
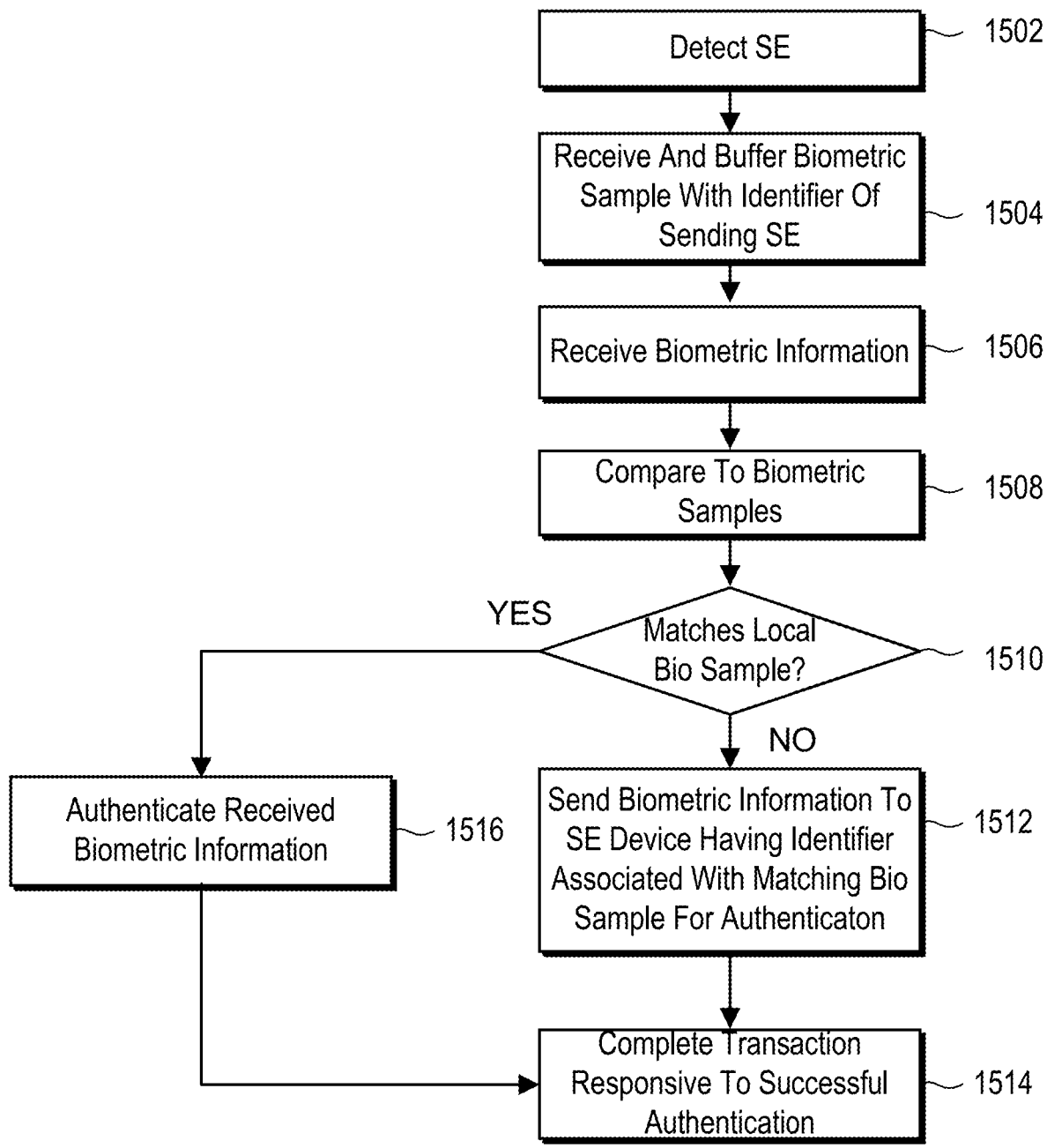
FIG. 15 is a flowchart of a method for a biometrically triggered transaction according to one embodiment.

FIG. 15 is a flowchart of a method 1500 for a biometrically triggered transaction according to one embodiment. The method begins at block 1502. At block 1502, an SE 102 detects another SE 102 in range. At block 1504, the SE 102 receives and buffers a biometric sample with an identifier of the other SE 102 that sent the biometric sample. At block 1506, the SE 102 receives biometric information. At block 1508, identification module 904 compares the biometric information to the biometric samples buffered on the SE 102. When biometric information matches (1510—Yes) the local biometric sample (i.e. the biometric sample of the SE 102 that received and buffered the biometric samples at block 1504), at block 1516, the identification module 904 of that SE 102 authenticates the biometric information received at block 1506 against the biometric information of the SE's 102 owner and, at block 1514, the wallet module 908 completes a transaction responsive to successful authentication at block 1516. When biometric information does not match (1510—No) the local biometric sample, at block 1512, the biometric information received at block 1506 is sent to an SE 102 device having the identifier associated with the matching biometric sample for authentication by that SE's 102 identification module 904, and responsive to successful authentication by that SE's 102 identification module 904, the wallet module 908 of the authenticating SE 102 completes a transaction at block 1514.

Figure 16:
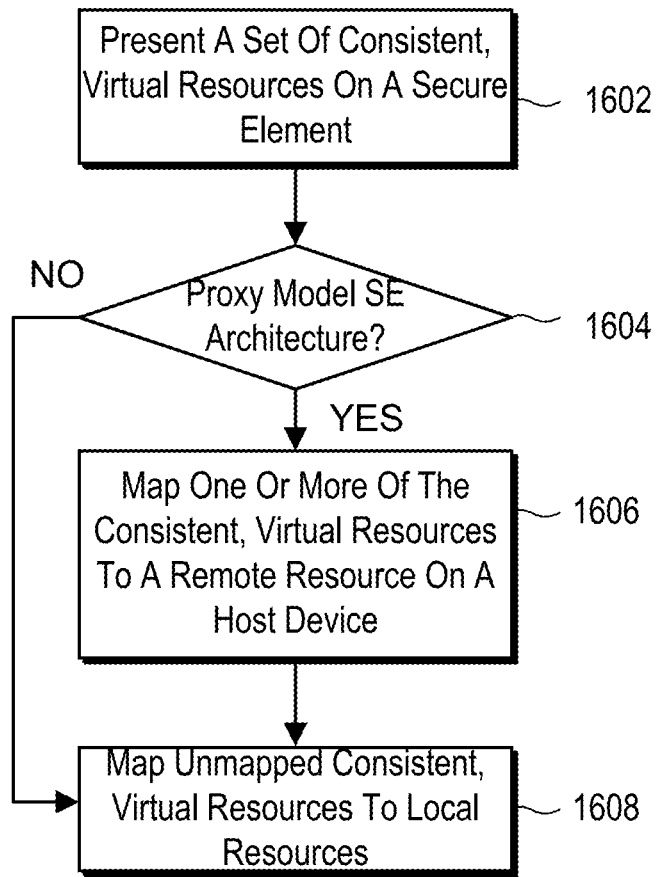
FIG. 16 is a flowchart of a method for hardware abstraction based on a secure element architecture according to one embodiment.

FIG. 16 is a flowchart of a method 1600 for hardware abstraction based on a secure element architecture according to one embodiment. The method 1600 begins at step 1602. At step 1602, a set of virtual resources are consistently presented on a SE 102. At block 1604, the SE 102 determines a secure element (SE) architecture. If the SE 102 determines that the SE architecture is not a proxy model architecture (1604—No), the method 1600 continues at block 1608. If the SE 102 determines that the SE architecture is a proxy model architecture (1604—Yes), the method 1600 continues at block 1606.

At block 1606, the abstraction layer 220 of the SE 102 maps one or more of the set of consistent, virtual resources to a remote resource on a host device 120 before continuing to block 1608. At block 1608, the abstraction layer 220 of the SE 102 maps unmapped consistent, virtual resources to local resources on the SE 102.

Figure 17:
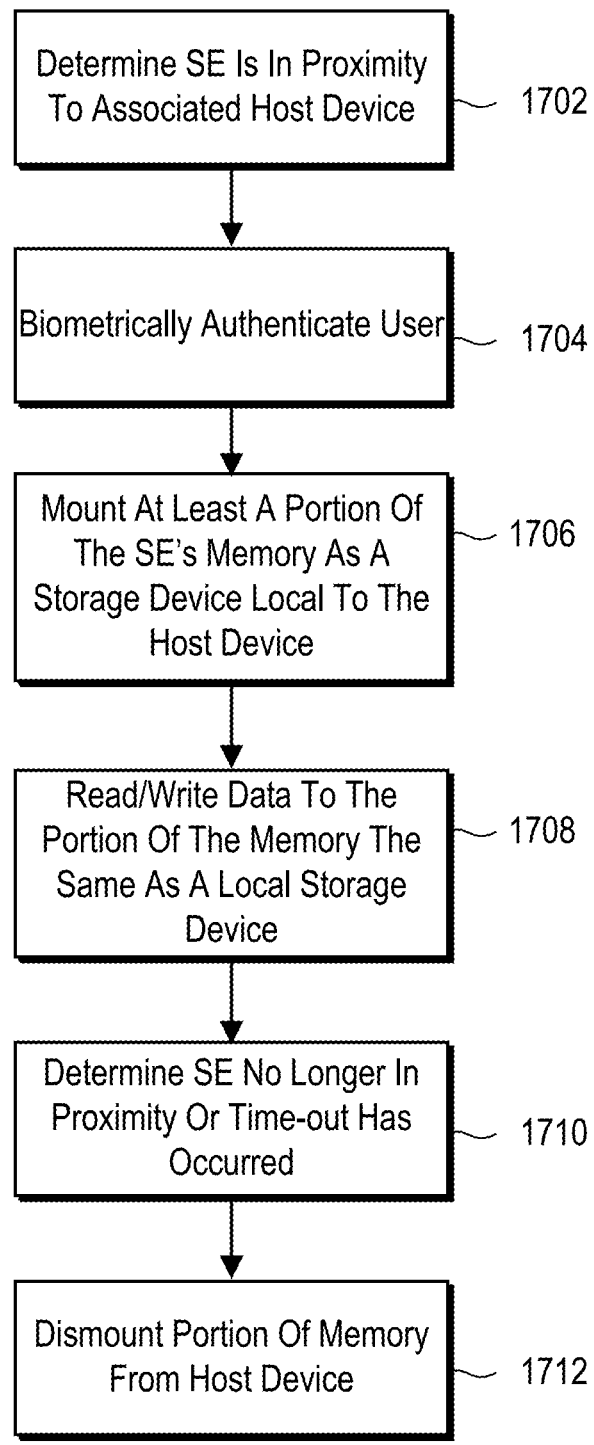
FIG. 17 is a flowchart of a method for a secure element acting as a wireless storage device according to one embodiment.

FIG. 17 is a flowchart of a method 1700 for a secure element acting as a wireless storage device according to one embodiment. The method 1700 begins at block 1702. At block 1702, one or more of an SE 102 and an associated host device 120 determines that the two devices 102, 120 are proximate. At block 1704, the SE 102 biometrically authenticates the user. At block 1706, the host device 120 mounts at least a portion of SE 102's memory as a local storage device. At block 1708, the host device 120 reads data from and/or writes data to the mounted portion of the SE's 102 memory as it would do with a local storage device attached to or included in the host device 120. At block 1710, a determination is made that the SE 102 and host device 120 are no longer proximate or a time-out has occurred (e.g. requiring the user to re-authenticate after a specified duration of time has elapsed in order to keep the portion of memory mounted). At block 1712, the host device 120 dismounts the portion of the SE's 102 memory.

In the above description, for purposes of explanation, numerous specific details are set forth in order to provide a thorough understanding of the specification. It will be apparent, however, to one skilled in the art that the specification may be practiced without these specific details. In other instances, structures and devices are shown in block diagram form in order to avoid obscuring the description. For example, one embodiment is described above with reference to particular hardware. However, the specification applies to any type of portable computing device that can receive data and commands.

Reference in the specification to "one embodiment" or "an embodiment" means that a particular feature, structure, or characteristic described in connection with the embodiment is included in at least one embodiment of the specification. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the specification can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to a particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system comprising:
a secure element including a radio transceiver configured to wirelessly communicate, and a secure memory, the secure memory accessible wirelessly through the radio transceiver; and
a host device including a host processor coupled to a host memory, the host memory including a secure element link module, the host device configured to wirelessly and securely communicate with the radio transceiver of the secure element, the secure element link module cooperating with the secure memory to wirelessly mount a portion of the secure memory as an internal storage drive of the host device.

2. The system of claim 1 including:
a biometric sensor configured to obtain physical or behavioral characteristics from a user, the biometric sensor coupled for communication with the secure element; and
wherein the secure element authenticates the user as an owner of the secure element based on an obtained physical or behavioral characteristic.

3. The system of claim 2, wherein access to the portion of the secure memory mounted as the internal storage drive is restricted and accessible subsequent to successful authentication of the user as the owner based on the obtained physical or behavioral characteristic.

4. The system of claim 1, wherein the host device and the secure element are physically separate devices, the host device controlling memory storage or retrieval operations performed on the portion of the secure memory mounted as the internal storage drive on behalf of the host device.

5. The system of claim 1, wherein the secure element is platform agnostic and operates independent of a platform the host device is operating.

6. The system of claim 1, wherein the secure element includes a set of consistent virtual resources used to map a set of available resources, which is variable based on one or more of a model architecture and resources associated with the host device, and the set of consistent virtual resources allows consistent interaction with the set of consistent virtual resources independent of variation in the set of available resources and independent of whether a resource within the set of available resources is located at the secure element, at the host device, or both.

7. The system of claim 6, wherein the host device makes a first resource available to the secure element.

8. The system of claim 7, wherein the first resource available to the secure element is a physical resource and hardware abstraction is provided.

9. The system of claim 6, wherein a biometric sensor is a resource included in the host device and available to the secure element as a virtual biometric sensor via an abstraction layer.

10. A method comprising:
establishing wireless communication between a secure element and a secure element link module of a host device, a secure memory and a radio transceiver for wireless communication, the host device including a host processor and a host memory having the secure element link module, the host processor and the host memory coupled for wireless communication; and
wirelessly mounting a portion of the secure memory as an internal storage drive of the host device.

11. The method of claim 10, including:
obtaining a physical or behavioral characteristic from a user; and
authenticating the user as an owner of the secure element based on an obtained physical or behavioral characteristic.

12. The method of claim 11, wherein access to the portion of the secure memory mounted as the internal storage drive is restricted and accessible subsequent to successful authentication of the user as the owner based on the obtained physical or behavioral characteristic.

13. The method of claim 10, wherein the host device and the secure element are physically separate devices, the host device controlling memory storage or retrieval operations performed on the portion of the secure memory mounted as the internal storage drive on behalf of the host device.

14. The method of claim 10, wherein the secure element is platform agnostic and operates independent of a platform the host device is operating.

15. The method of claim 10, further comprising:
presenting, to the secure element, a set of consistent virtual resources; and
mapping the set of consistent virtual resources to a set of available resources, which is variable based on one or more of a model architecture and resources associated with the host device, and the set of consistent virtual resources allows consistent interaction with the set of consistent virtual resources independent of variation in the set of available resources and independent of whether a resource within the set of available resources is located at the secure element, at the host device, or both.

16. The method of claim 15, wherein the host device makes a first resource available to the secure element.

17. The method of claim 16, wherein the first resource available to the secure element is a physical resource and hardware abstraction is provided.

18. The method of claim 15, wherein a biometric sensor is a resource included in the host device and available to the secure element as a virtual biometric sensor via an abstraction layer.

* * * * *